United States Patent
Liu et al.

(10) Patent No.: US 10,496,104 B1
(45) Date of Patent: *Dec. 3, 2019

(54) POSITIONAL AWARENESS WITH QUADOCULAR SENSOR IN AUTONOMOUS PLATFORMS

(71) Applicant: PerceptIn Shenzhen Limited, Shenzhen (CN)

(72) Inventors: Shaoshan Liu, Fremont, CA (US); Zhe Zhang, Sunnyvale, CA (US); Grace Tsai, Campbell, CA (US)

(73) Assignee: PerceptIn Shenzhen Limited, Shenzhen (CN)

( * ) Notice: Subject to any disclaimer, the term of this patent is extended or adjusted under 35 U.S.C. 154(b) by 117 days.

This patent is subject to a terminal disclaimer.

(21) Appl. No.: 15/642,258

(22) Filed: Jul. 5, 2017

(51) Int. Cl.
| | | |
|---|---|---|
| G05D 1/02 | (2006.01) | |
| G07C 5/08 | (2006.01) | |
| G01C 21/16 | (2006.01) | |
| G01S 19/23 | (2010.01) | |
| G01S 19/14 | (2010.01) | |

(52) U.S. Cl.
CPC .......... G05D 1/0251 (2013.01); G01C 21/165 (2013.01); G01S 19/14 (2013.01); G01S 19/23 (2013.01); G05D 1/027 (2013.01); G05D 1/0278 (2013.01); G07C 5/0816 (2013.01)

(58) Field of Classification Search
CPC .. G06K 9/00; G06K 9/46; G06K 9/62; G06K 2207/30244; G06K 9/00711; G06K 9/03; G06T 17/05; G06T 7/74; G06T 7/50; G06T 7/248; G06T 1/60; G01P 1/12; G01P 15/18; G05D 1/0246; H04N 13/261; H04N 5/2353; G01C 20/21
See application file for complete search history.

(56) References Cited

U.S. PATENT DOCUMENTS

| | | | |
|---|---|---|---|
| 8,380,384 B2 | 2/2013 | Lee et al. | |
| 8,655,094 B2 | 2/2014 | Miller et al. | |
| 8,655,588 B2 * | 2/2014 | Wong | G01S 17/023 |
| | | | 701/500 |
| 8,774,517 B1 | 7/2014 | Khosla et al. | |

(Continued)

FOREIGN PATENT DOCUMENTS

| | | |
|---|---|---|
| CN | 106537186 A | 3/2017 |
| CN | 107137026 A | 9/2017 |

(Continued)

OTHER PUBLICATIONS

Tanskanen et al., Semi-direct EKF-based monocular visual-inertial odometry, 2015, IEEE, p. 6073-6078 (Year: 2015).*

(Continued)

*Primary Examiner* — Mcdieunel Marc
(74) *Attorney, Agent, or Firm* — Haynes Beffel & Wolfeld, LLP; Ernest J. Beffel, Jr.

(57) ABSTRACT

The described positional awareness techniques employing sensory data gathering and analysis hardware with reference to specific example implementations implement improvements in the use of sensors, techniques and hardware design that can enable specific embodiments to provide positional awareness to machines with improved speed and accuracy. The sensory data are gathered from multiple operational cameras and one or more auxiliary sensors.

23 Claims, 17 Drawing Sheets

(56) References Cited

U.S. PATENT DOCUMENTS

| | | | |
|---|---|---|---|
| 8,824,802 | B2 | 9/2014 | Kutliroff et al. |
| 9,026,941 | B1 | 5/2015 | Krueger et al. |
| 9,058,563 | B1 | 6/2015 | Krueger et al. |
| 9,076,212 | B2 | 7/2015 | Ernst et al. |
| 9,280,576 | B2 | 3/2016 | Trotta et al. |
| 9,378,431 | B2 | 6/2016 | Stoeffler et al. |
| 9,507,346 | B1* | 11/2016 | Levinson ............ G05D 1/0214 |
| 9,519,289 | B2 | 12/2016 | Munich et al. |
| 9,607,428 | B2 | 3/2017 | Li |
| 9,751,210 | B2 | 9/2017 | Fong et al. |
| 9,836,653 | B2 | 12/2017 | Schnittman |
| 9,965,689 | B2 | 5/2018 | dos Santos Mendonca et al. |
| 10,032,276 | B1 | 7/2018 | Liu et al. |
| 10,043,076 | B1* | 8/2018 | Zhang ............... G06K 9/00671 |
| 10,162,362 | B2* | 12/2018 | Tsai .................... G05D 1/0246 |
| 10,192,113 | B1* | 1/2019 | Liu .................... G06K 9/00664 |
| 10,222,805 | B2 | 3/2019 | Munich et al. |
| 2008/0249732 | A1 | 10/2008 | Lee et al. |
| 2010/0045701 | A1 | 2/2010 | Scott et al. |
| 2010/0121601 | A1 | 5/2010 | Eckert |
| 2010/0220173 | A1 | 9/2010 | Anguelov et al. |
| 2011/0044543 | A1 | 2/2011 | Nakamura et al. |
| 2012/0201469 | A1 | 8/2012 | Livet et al. |
| 2013/0282208 | A1 | 10/2013 | Mendez-Rodriguez et al. |
| 2013/0335554 | A1 | 12/2013 | Brunner et al. |
| 2014/0369557 | A1 | 12/2014 | Kayombya et al. |
| 2016/0209217 | A1 | 7/2016 | Babu et al. |
| 2016/0364835 | A1* | 12/2016 | Srebnik .............. G06F 12/0842 |
| 2017/0010109 | A1 | 1/2017 | Hayon et al. |
| 2017/0089948 | A1 | 3/2017 | Ho et al. |
| 2017/0206418 | A1 | 7/2017 | Schnittman |
| 2017/0277197 | A1 | 9/2017 | Liao et al. |
| 2017/0357873 | A1 | 12/2017 | Roimela et al. |
| 2018/0035606 | A1 | 2/2018 | Burdoucci |
| 2018/0224286 | A1 | 8/2018 | Pickering et al. |
| 2018/0286072 | A1* | 10/2018 | Tsai ........................ G06T 7/579 |
| 2018/0364731 | A1* | 12/2018 | Liu ..................... G05D 1/0246 |

FOREIGN PATENT DOCUMENTS

| | | |
|---|---|---|
| CN | 107153247 A | 9/2017 |
| CN | 107291080 A | 10/2017 |
| CN | 206932609 U | 1/2018 |
| CN | 206932645 U | 1/2018 |
| CN | 206932646 U | 1/2018 |
| CN | 206932647 U | 1/2018 |
| CN | 206932653 U | 1/2018 |
| CN | 206932676 U | 1/2018 |
| CN | 206932680 U | 1/2018 |
| CN | 206932902 U | 1/2018 |
| CN | 206935560 U | 1/2018 |
| CN | 206946068 U | 1/2018 |
| CN | 207070613 U | 3/2018 |
| CN | 207070621 U | 3/2018 |
| CN | 207070638 U | 3/2018 |
| CN | 207151236 U | 3/2018 |
| CN | 207443493 U | 6/2018 |
| EP | 3224649 A1 | 10/2017 |
| JP | 2017538208 A | 12/2017 |
| WO | 2012040644 A1 | 3/2012 |
| WO | 2016085717 A1 | 6/2016 |

OTHER PUBLICATIONS

Liu et al., Stereo Visual-Inertial Odometry With Multiple Kalman Filters Ensemble, 2016, IEEE, gp. 6205-6216 (Year: 2016).*

Ess et al., Robust Multiperson Tracking from a Mobile Platform, 2009, IEEE, p. 1831-1846 (Year: 2009).*

Velagic et al., Localization of holonomous mobile robot HOLBOS using extended Kalman filter (EKF) and robotic vision, 2013, IEEE, p. 4180-4185 (Year: 2013).*

Multilateration—Wikipedia, http://en.wikipedia.org/w/index.php?title=Multilateration&oldid=523281858, accessed Mar. 8, 2018, 5 pages.

U.S. Appl. No. 15/642,189—Notice of Allowance dated Sep. 11, 2018, 15 pages.

U.S. Appl. No. 15/642,189—Non-Provisional Patent Application filed Jul. 5, 2017, 80 pages.

ORB feature detector and binary descriptor, http://scikit-image.org/docs/dev/auto_examples/features_detection/plot_orb.html. scikit-image, 2 pages, accessed Aug. 17, 2016.

Li, et.al., "High-precision, consistent EKF-based visual-inertial odometry", International Journal of Robotics Research, May 2013, 2 pages, [retrieved on Aug. 22, 2016]. Retrieved from the Internet<http://ijr.sagepub.com/content/32/6/690.abstract>.

Mur-Artal, et al., ORB-SLAM: A Versatile and Accurate Monocular SLAM System, abstract, IEEE Transactions on Robotics, 2015. vol. 31, Issue 5, 2 pages, [retrieved on Aug. 22, 2016]. Retrieved from the Internet< >.

Rublee, et al., "ORB: An efficient alternative to SIFT or SURF," In Computer Vision (ICCV), 2011 IEEE international conference on, 8 pages.

How Oculus Rift works: Everything you need to knowabout the VR sensation, 15-pages, [retrieved on Jul. 8, 2016]. Retrieved from the Internet<http://www.wareable.com/oculus-rift/how-oculus-rift-works>.

U.S. Appl. No. 15/250,419—Office Action dated Jan. 31, 2018, 10 pages.

ORB Feature Detector and Binary Descriptor, http://scikit-image.org/docs/dev/auto_examples/features_detection/plot_orb.html (accessed Feb. 13, 2018), 3 pages.

OpenCV—Camera Calibration and 3D Reconstruction, Open Source Computer Vision, https://docs.opencv.org/master/d9/d0c/group_calib3d.html (accessed Feb. 13, 2018), 50 pages.

U.S. Appl. No. 15/250,393—Office Action dated Mar. 1, 2018, 10 pages.

U.S. Appl. No. 15/250,419—Response to Office Action dated Jan. 31, 2018 filed Feb. 13, 2018, 13 pages.

U.S. Appl. No. 15/250,419—Notice of Allowance dated Mar. 20, 2018, 7 pages.

U.S. Appl. No. 15/250,393—Notice of Allowance dated Apr. 6, 2018, 6 pages.

U.S. Appl. No. 15/250,581—Notice of Allowance dated May 21, 2018, 18 pages.

U.S. Appl. No. 15/658,279—Notice of Allowance dated Aug. 15, 2018, 11 pages.

U.S. Appl. No. 15/658,279—Office Action dated Jun. 11, 2018, 11 pages.

U.S. Appl. No. 15/250,393—Response to Office Action dated Mar. 1, 2018 filed Mar. 19, 2018, 15 pages.

U.S. Appl. No. 15/658,279—Response to Office Action dated Jun. 11, 2018 filed Jul. 31, 2018, 14 pages.

U.S. Appl. No. 16/010,331—Office Action dated Oct. 10, 2018, 11 pages.

U.S. Appl. No. 16/010,345—Office Action dated Oct. 10, 2018, 11 pages.

U.S. Appl. No. 15/960,449—Office Action dated Oct. 11, 2018, 16 pages.

U.S. Appl. No. 15/961,798—Office Action dated Oct. 12, 2018, 21 pages.

U.S. Appl. No. 15/648,372—Notice of Allowance dated Oct. 31, 2018, 17 pages.

EP 18182408.7—Extended European Search Report dated Nov. 21, 2018, 12 pages.

Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1309-1332.

U.S. Appl. No. 16/010,345—Response to Office Action dated Oct. 10, 2018, filed Nov. 30, 2018 12 pages.

U.S. Appl. No. 16/010,345—Notice of Allowance dated Jan. 17, 2019, 20 pages.

U.S. Appl. No. 15/960,449—Response to Office Action dated Oct. 11, 2018, filed Jan. 25, 2019, 11 pages.

(56) References Cited

OTHER PUBLICATIONS

U.S. Appl. No. 16/010,331—Response to Office Action dated Oct. 10, 2018, filed Dec. 3, 2018, 13 pages.
U.S. Appl. No. 16/010,331—Office Action dated Jan. 3, 2019, 19 pages.
U.S. Appl. No. 15/961,798—Response to Office Action dated Oct. 12, 2018, filed Jan. 11, 2019, 13 pages.
U.S. Appl. No. 15/961,798—Notice of Allowance dated Feb. 6, 2019, 20 pages.
U.S. Appl. No. 15/250,581—Notice of Allowance dated Jan. 9, 2019, 16 pages.
EP 18184739.3—Extended Search Report dated Jan. 30, 2019, 8 pages.
U.S. Appl. No. 16/010,331—Response to Office Action dated Jan. 3, 2019, filed Mar. 4, 2019, 9 pages.
U.S. Appl. No. 16/010,345—Notice of Allowance dated Apr. 17, 2019, 12 pages.

\* cited by examiner

POSITIONAL AWARENESS WITH QUADOCULAR SENSOR IN AUTONOMOUS PLATFORMS

CROSS-REFERENCE TO OTHER APPLICATIONS

The following U.S. patent applications are incorporated by reference herein: U.S. Non-provisional application Ser. No. 15/250,419, filed Aug. 29, 2016, entitled "VISUAL-INERTIAL POSITIONAL AWARENESS FOR AUTONOMOUS AND NON-AUTONOMOUS DEVICE", U.S. Non-provisional application Ser. No. 15/250,393, filed Aug. 29, 2016, entitled "VISUAL-INERTIAL POSITIONAL AWARENESS FOR AUTONOMOUS AND NON-AUTONOMOUS TRACKING", U.S. Non-provisional application Ser. No. 15/250,581, filed Aug. 29, 2016, entitled "VISUAL-INERTIAL POSITIONAL AWARENESS FOR AUTONOMOUS AND NON-AUTONOMOUS MAPPING," U.S. Non-provisional application Ser. No. 15/623,106, filed Jun. 14, 2017, entitled "MONOCULAR MODES FOR AUTONOMOUS PLATFORM GUIDANCE SYSTEMS WITH AUXILIARY SENSORS", and U.S. Non-provisional application Ser. No. 15/642,189, filed Jul. 5, 2017, entitled "QUADOCULAR SENSOR DESIGN IN AUTONOMOUS PLATFORMS".

FIELD OF THE TECHNOLOGY DISCLOSED

The technology disclosed generally relates to detecting location and positioning of an autonomous mobile unit, and more particularly relates to the application of visual processing, inertial sensor data, radio navigational data, and wheel odometry data to positioning and guidance technologies.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Autonomous robots have long been the stuff of science fiction fantasy. One technical challenge for autonomous robots is the need to be able to identify where they are, where they have been and plan where they are going. Traditional SLAM techniques have improved significantly in recent years; however, there remain considerable technical challenges to providing fast accurate and reliable positional awareness to robots and self-guiding mobile platforms. One especially challenging area involves recognizing the autonomous robot location and obstructions near the autonomous robot accurately and quickly. A variety of different approaches has been tried. For example, RFID/Wi-Fi approaches have proven to be expensive and of limited accuracy. Depth sensor based approaches have been found to be high cost and suffering from power drain and interference issues. Marker-based approaches require markers placed within the work area—limiting the useful area in which the device can operate. Visual approaches currently are slow, leading to failure when used in fast motion applications. Visual approaches can also suffer scale ambiguity.

In recent years, there has been enormous interest in making vehicles smarter. Autonomous vehicles could free drivers of the burden of driving while enhancing vehicle safety. Autonomous vehicles can benefit from fast, accurate and reliable positional awareness. For example, for an autonomous vehicle to follow a road, it needs to know its location on the road, where it has been previously and where it is planning on going. For the autonomous vehicle to stay in a particular lane, it needs to know the location of the lane markers. When an obstacle is detected in the planned path, the planned route needs to be modified by the autonomous vehicle to avoid the obstacle and continue its way to its destination. In general, highways tend to be more predictable and orderly, with road surfaces typically well maintained and lanes well-marked. In contrast, residential or urban driving environments feature a much higher degree of unpredictability with many generic objects, inconsistent lane markings, and elaborate traffic flow patterns. For an autonomous vehicle to stay in a lane, the localization requirements are in the order of decimeters. GPS alone is insufficient and does not meet these requirements. In today's production-grade autonomous vehicles, critical sensors include radar, sonar, and cameras. Long-range vehicle detection typically requires radar, while nearby car detection can be solved with sonar. Radar works reasonably well for detecting vehicles, but has difficulty distinguishing between different metal objects and thus can register false positives on objects such as tin cans, mailbox, etc. Also, radar provides little orientation information and has a higher variance on the lateral position of objects, making the localization difficult on sharp bends. The utility of sonar is both compromised at high speeds and, even at slow speeds, is limited to a working distance of about two meters.

The challenge of providing fast reliable affordable positional awareness to autonomous robots and vehicles heretofore remained largely unsolved.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

Figure 1:
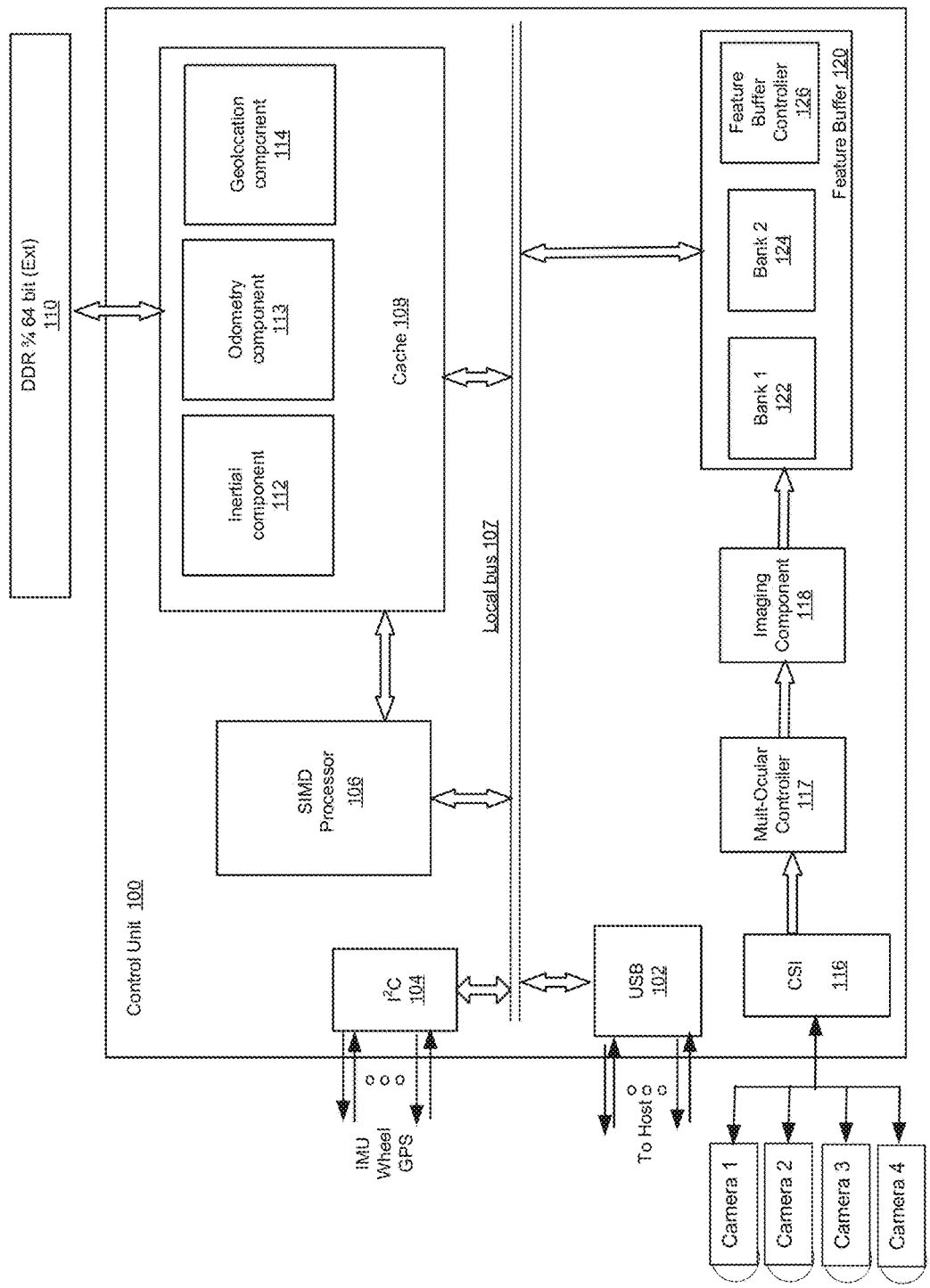
FIG. 1 illustrates an example of a control unit for a multi-ocular-auxiliary sensor.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, an introduction describing some of the problems addressed by various implementations will be presented. Then, a high-level description of one implementation will be discussed at an architectural level. Next, the processes used by some implementations to efficiently process image and data from the auxiliary sensors are discussed. Lastly, the technology disclosed will be illustrated with reference to particular applications of (i) Warehouse robots and self-guided autonomous platforms, and (ii) Autonomous vehicles. The references to specific examples are intended to be illustrative of the approaches disclosed herein rather than limiting.

This document describes positional awareness techniques employed by an autonomous mobile unit by using visual sensory data from a multi-ocular system that provides a 360-degrees view. In one embodiment, the multi-ocular sensor includes four interfaces to couple with four cameras, each camera providing a field of view of at least 200 degrees. The four cameras are configured into two back-to-back pairs, whereby each pair of cameras can be disposed of horizontally or vertically with respect to the other pair of cameras. As each camera have a field of view of at least 200 degrees, each back-to-back pair of cameras provide a 360-degrees view. Therefore two back-to-back pairs of cameras will provide two 360-degrees views. By comparing these two 360-degrees views, the relative depth information of objects around the autonomous mobile unit can be obtained in the form of a disparity map, which encodes the difference in horizontal coordinates of corresponding image points. The values in this disparity map are inversely proportional to the scene depth at the corresponding pixel location. As used herein, the term "quadocular" will be used to describe any multi-ocular system that includes four cameras, each providing a field of view of at least 200 degrees. In other embodiments, the multi-ocular sensor may include more than one camera, each camera providing a field of view of more than 180 degrees.

When an autonomous mobile unit moves, images taken before and after the movement can be analyzed to estimate the new position of the unit. This process is known as visual odometry. Therefore, the pair of 360-degrees frames can be compared by extracting and matching key features in the frames. One main limitation of visual odometry is the inaccurate estimation of the absolute depth scale or magnitude of the movement of the mobile unit. Indeed, even if camera pose estimation and scene reconstruction are carried out accurately, the error in the estimated depth of key features by stereo matching grows quadratically with depth or distance of the key features. In other words, the inaccuracy of the depth of key features in the far range is much higher that of the near range. While the depth accuracy in the far range is unusably bad, the depth accuracy in the near range is significant. Some approaches suggest solving the issue via object detection by matching the scene with a pre-defined set of 3D models, so to recover the initial depth scale based on the estimated object size, which nevertheless fails in the absence of known shapes in the scene.

Data from one or more auxiliary sensors can be used to rectify the depth inaccuracy. In one embodiment, the auxiliary sensor can be a multi-axis inertial measurement unit (IMU), which measures and reports the mobile unit's linear acceleration using one or more accelerometers and rotational rate using one or more gyroscopes. In one embodiment, the auxiliary sensor can be a wheel odometry unit (WOU), which measures and reports the mobile unit's displacement from the encoder readings of the mobile unit's wheels. In one embodiment, the auxiliary sensor can be a global positioning system (GPS) receiver, which provides the autonomous mobile unit's geolocation at a given time. In one embodiment, the mobile unit can have two auxiliary sensors, an IMU and a WOU. In one embodiment, the mobile unit can have an IMU and a GPS receiver as its two auxiliary sensors. In one embodiment, the mobile unit can have three auxiliary sensors, an IMU, a GPS receiver and a WOU.

The cameras or the imaging sensors in the multi-ocular system can be RGB or grayscale. Using low-end imaging sensors to construct a sensor, e.g., cameras having a resolution of 640×480, obviates the cost of high-end image sensors. Wider field of view can be achieved by ultra wide-angle fisheye lenses that produce strong visual distortion intended to create a wide panoramic or hemispherical image.

Examples of robot applications that benefit from employing positional awareness techniques such as described herein includes caregiver and service robots (traveling on a ground plane), a robot being commanded to carry objects around the environment (a warehouse robot, a delivery robot), a telepresence robot moving around a remote environment automatically, a robot butler that follows a person around, etc.

The positional awareness techniques described herein can also be used in autonomous vehicles and driver assistance systems that enhance the awareness and safety of human drivers, such as adaptive cruise control, lane departure warning and lane change assistant.

In each of the scenarios listed above, the autonomous mobile unit utilizes the techniques described herein to track its location and to recognize the objects that it encounters. Also, since the autonomous mobile unit performs many complex tasks, each with real-time constraints, it is beneficial that the sensing is done rapidly to accelerate the perception pipeline. For the autonomous mobile unit to overcome the computational burden imposed by this processing, implementations offload some computation with regards to image processing from the main processor to an imaging component or a digital signal processor. In addition, since it is a mobile unit with limited battery, energy consumption is a major challenge. Accordingly, some implementations offload some computational tasks from the main processor to a low-power sensor module, thereby enabling implementations to achieve overall energy efficiency.

Examples of systems, apparatus, and methods according to the disclosed implementations are described in a warehouse robot guidance context and an autonomous vehicle context. In other instances, the technology disclosed can be applied to, navigation, telecommunications systems, financial systems, security trading, banking, business intelligence, marketing, mining, energy, etc. and using sonar, audio, GPS and LIDAR data. Other services are possible, such that the following examples should not be taken as definitive or limiting either in scope, context, or setting.

The technology disclosed relates to improving utilization of computing resources such as computational power and memory use during processing of image and data from auxiliary sensors inside a single input-multiple data (SIMD) architecture. The technology disclosed can be implemented in the context of any computer-implemented system including a reduced instruction set (RISC) system, emulated hardware environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computer-implemented system like a NEON ARM VFP9-S processor, an ARM core processor, or a compatible processor implementation.

In addition, the technology disclosed can be implemented using a variety of different imaging sensors and technologies, including RGB, grayscale, IR, sonar, LIDAR or combinations thereof.

System Overview

Control Unit for the Multi-Ocular-Auxiliary Sensor

FIG. 1 illustrates an example of a Control Unit for a multi-ocular-auxiliary sensor in block diagram format. Control Unit 100 in FIG. 1 can be coupled to an external memory 110, a flash memory (not shown in FIG. 1 for clarity sake), and one or more persistent storages such as HDDs, optical drives or the like (also not shown in FIG. 1 for clarity sake). Control Unit 100 includes a memory cache 108, a USB I/O port 102, a Camera Serial Interface (CSI) I/O port 116 that facilitates directly receiving images from four cameras, a multi-ocular controller 117, imaging component 118, an Inter-Integrated Circuit ($I^2C$) I/O ports 104, a single instruction multiple-data (SIMD) capable processor 106, and a feature buffer 120. The components in the Control Unit 100 are intercoupled by a local bus 107. In an embodiment, the external memory 110 is a 64-bit double data rate (DDR) random access memory (RAM). In an embodiment, the SIMD capable processor 106 is implemented as a reduced instruction set computer (RISC) architecture. In an embodiment, the SIMD capable processor 106 is implemented as a NEON ARM VFP9-S. An inertial component 112, an odometry component 113, and a geolocation component 114 reside within the memory cache 108. In other embodiments, more than one camera can be connected to the Control Unit 100 through the Camera Serial Interface (CSI) I/O port 116.

Figure 2:
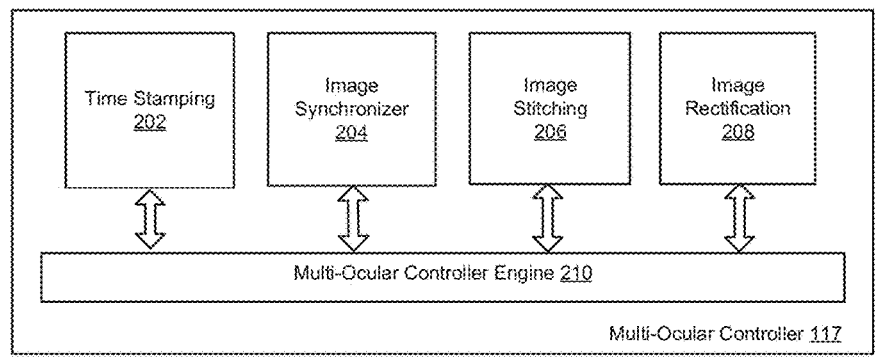
FIG. 2 illustrates an example of a multi-ocular controller in FIG. 1.

FIG. 2 illustrates an example of a multi-ocular controller 117 in FIG. 1. The multi-ocular controller 117 includes a multi-ocular controller engine 210 that implements a time stamping processor 202, an image synchronizer processor 204, an image stitching processor 206, and an image rectification processor 208. The image synchronizer processor 204 sends a synchronization signal to the cameras connected through the CSI I/O port 116 to acquire images in time frames relative to one another from the cameras. The time stamping processor 202 creates time stamps for the images captured by the cameras, thereby maintaining a set of synchronized images in which images captured are tagged with a current timestamp. In one embodiment, the time stamping processor 202 may have its own time block. In another embodiment, the time stamping processor 202 may synchs with the global real-time clock in the control unit 100. In one embodiment, the image stitching processor 206 combines the synchronized, time-stamped images with overlapping fields of view to produce a seamless 360-degrees view. In another embodiment, the image rectification processor 208 determines a rectification transformation of each synchronized, time-stamped image plane such that pairs of conjugate epipolar lines become collinear and parallel to one of the image axes. Therefore, the images with overlapping fields of view are rectified to a common image plane, resulting in a 360-degrees view. The multi-ocular controller 117 can be implemented as a field programmable gate array (FPGA).

Figure 3:
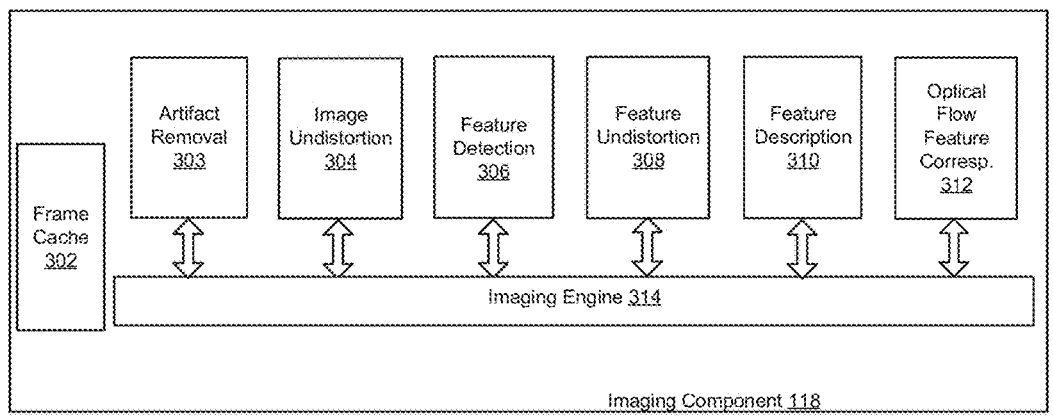
FIG. 3 illustrates an example of an imaging component in FIG. 1.

FIG. 3 illustrates an example of an imaging component 118 in FIG. 1. An Imaging component 118 includes a direct memory access (DMA) 302, an artifact removal processor 303, an image undistortion processor 304, a Shi-Tomasi processor 306, a feature undistortion processor 308, a feature description processor 310, and an optical flow feature correspondence processor 312 under control of an Imaging Engine 314.

The stitched or rectified image from the multi-ocular controller 117 is directly processed by the imaging component 118 to extract useful corner features and generates a descriptor for each feature. Imaging engine 214 can be implemented as a Digital Signal Processor (DSP). The imaging component 118 directly processes the incoming images without involving the SIMD processor 106 or storing the image data in the cache 108.

Figure 4:
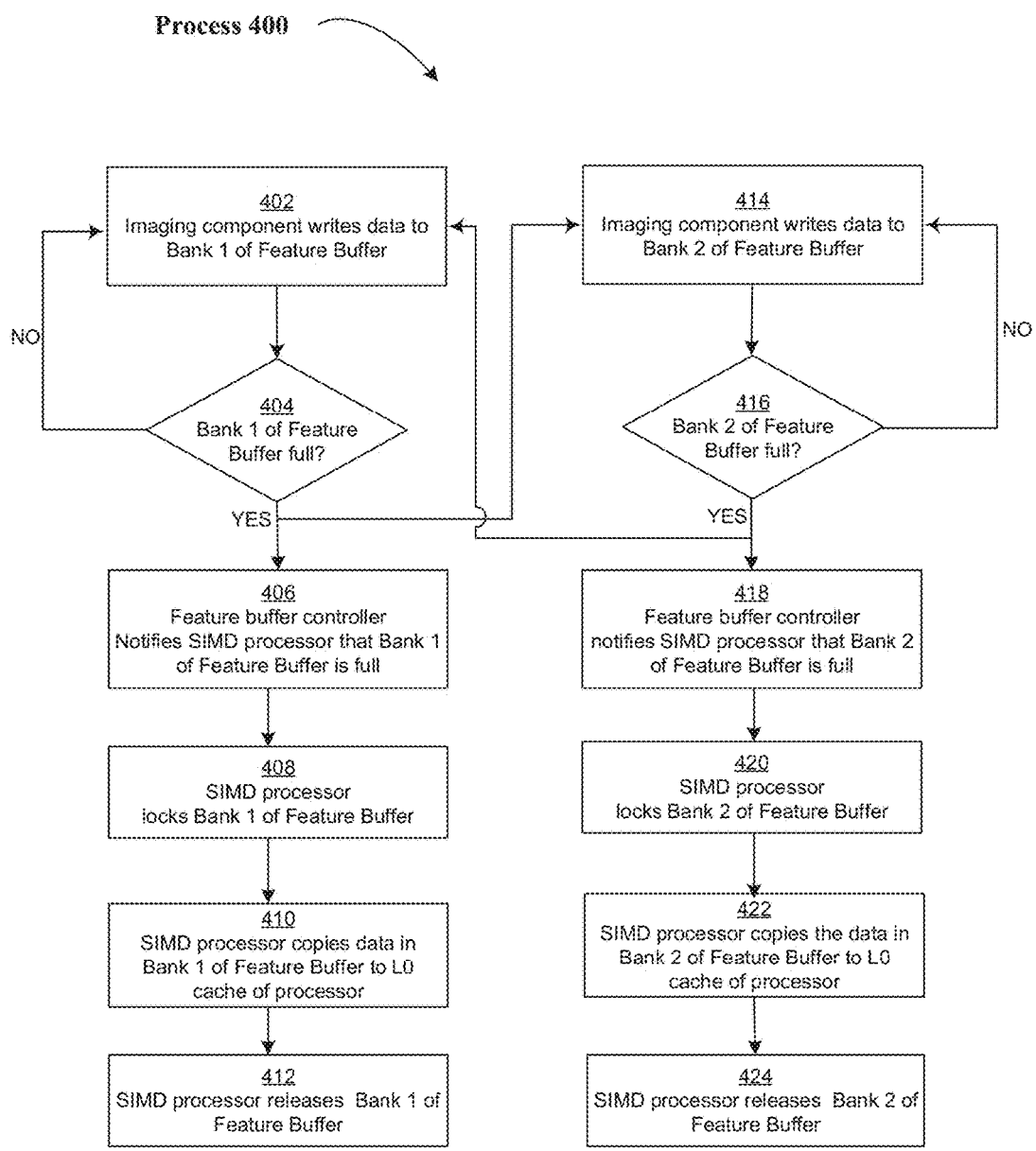
FIG. 4 illustrates a method of operation of the feature buffer in FIG. 1.

After the incoming images are analyzed, and key features are extracted by the imaging component 118, a feature buffer 120 stores the extracted features. The feature buffer 120 comprises of bank 1 122, bank 2 124 and a feature buffer controller 126. FIG. 4 illustrates a method of operation 400 of the feature buffer 120. The imaging component 118 can write data to either bank 1 (step 402) or bank 2 (step 414), but not concurrently. If the imaging component 118 is currently writing data to bank 1 and bank 1 becomes full (step 404), the feature buffer controller 126 notifies the SIMD processor 106 (step 406) that bank 1 is full. Meanwhile, the imaging component 118 starts writing data to bank 2 (step 414). The SIMD processor locks bank 1 (step 408), copies the data in bank 1 to the L0 cache available inside the SIMD processor (step 410), and releases bank 1 (step 412). If bank 2 becomes full (step 416), the feature buffer controller 126 notifies the SIMD processor 106 about the filled bank 2 (step 418), and the imaging component 118 starts writing data to bank 1 (step 402). The SIMD processor locks bank 2 (step 420), copies the data in bank 2 to the L0 cache available inside the SIMD processor (step 422), and releases bank 2 (step 424). Of course, other implementations in which additional banks are employed will be readily apparent to those skilled in the art.

Figure 5:
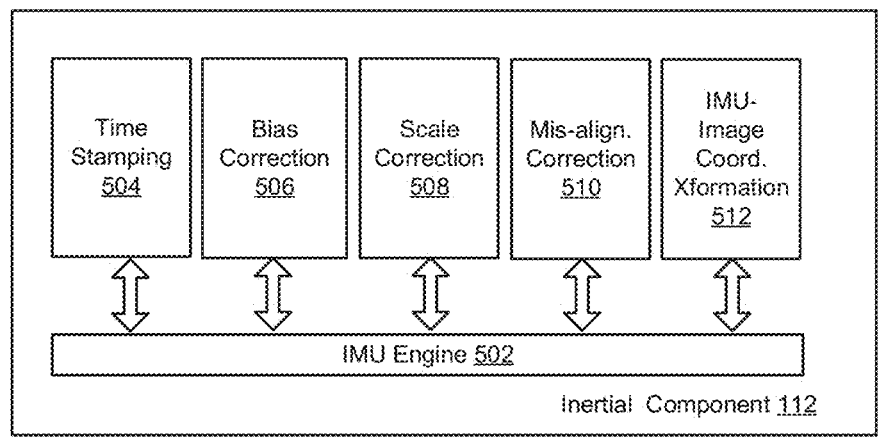
FIG. 5 illustrates an example of an inertial component in FIG. 1.

FIG. 5 illustrates an example of an inertial component 112 in FIG. 1. The Inertial component 112 includes an Inertial Measurement engine 502 that implements a time stamping processor 504 that time stamps sets of inertial data from an inertial sensor (not shown in FIG. 1 for clarity sake), a bias correction processor 506 that corrects data readout from the timestamped inertial data, a scale correction processor 508 that applies stored scale factor information to the corrected inertial data, a misalignment correction processor 510 that corrects misalignments of sensory elements of the inertial measurement sensor, and an IMU-Image coordinate transformation processor 512 that computes transformations describing differences between a frame of reference of the inertial data and a frame of reference of the image data.

Figure 6:
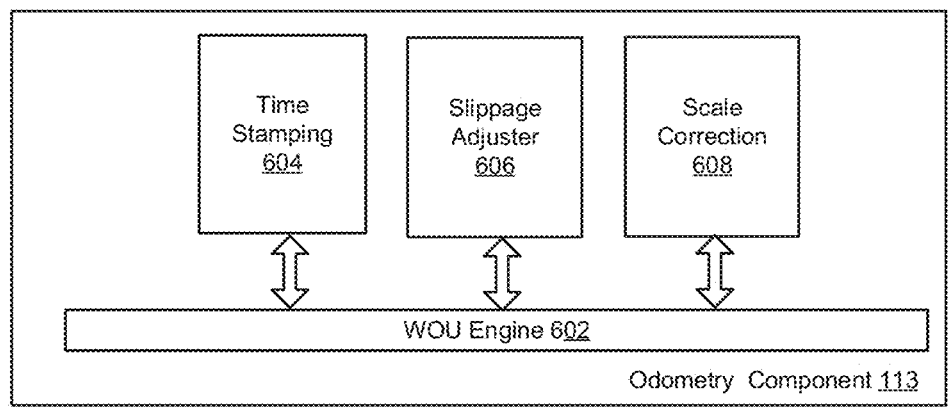
FIG. 6 illustrates an example of an odometry component in FIG. 1.

FIG. 6 illustrates an example of an odometry component 113 in FIG. 1. The odometry component 113 includes a Wheel Odometry Unit engine 602 that implements a time stamping processor 604 that time stamps sets of odometry data from mobile unit's rotary encoder (not shown in FIG. 1 for clarity sake), a slippage adjuster 606 that corrects data readout from the timestamped odometry data, and a scale correction processor 608 that applies stored scale factor information to the corrected odometry data. Implementations can detect variations in current demand of one or more motors driving a mobile platform and compare with data from the mobile unit's rotary encoder to determine whether a slippage state exists. When a slippage state is detected, the slippage adjuster 606 and the scale correction processor 608 can take action to remedy the slippage. Actions can include marking the odometry data as unreliable, applying a correction factor to the odometry data based upon a duration of slippage state. Other actions can be applied either instead of or in addition to the foregoing as apparent to a person skilled in the art.

Figure 7:
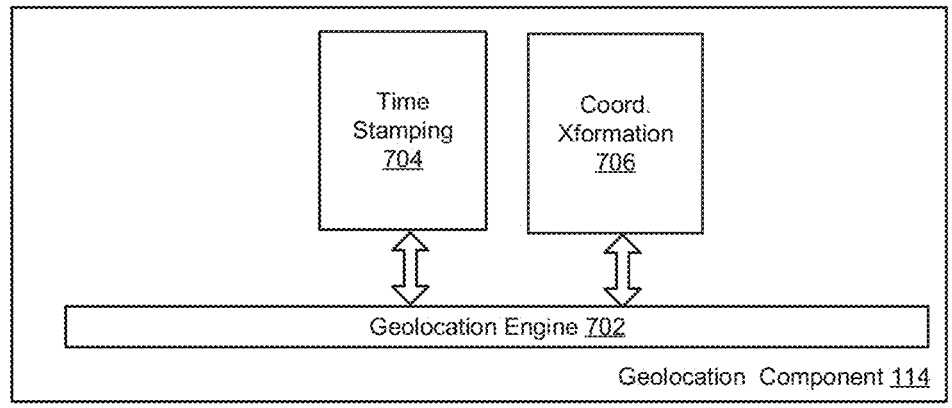
FIG. 7 illustrates an example of a geolocation component in FIG. 1.

FIG. 7 illustrates an example of a geolocation component 114 in FIG. 1. The geolocation component 114 includes a geolocation engine 702 that implements a time stamping processor 704 that time stamps sets of geolocation data from the autonomous mobile unit's GPS receiver (not shown in FIG. 1 for clarity sake), and a coordinate transformation processor 706 that computes transformations. The GPS receiver may receive geolocation of the autonomous mobile unit in North-East down (NED) coordinate format or Earth-Centered, Earth-Fixed (ECEF) format. The coordinate transformation processor 706 has the capability of translating any one of the geolocation coordinate formats of the GPS receiver to the one used by the autonomous mobile unit and vice versa.

Quadocular-Auxiliary Sensor

Figure 8:
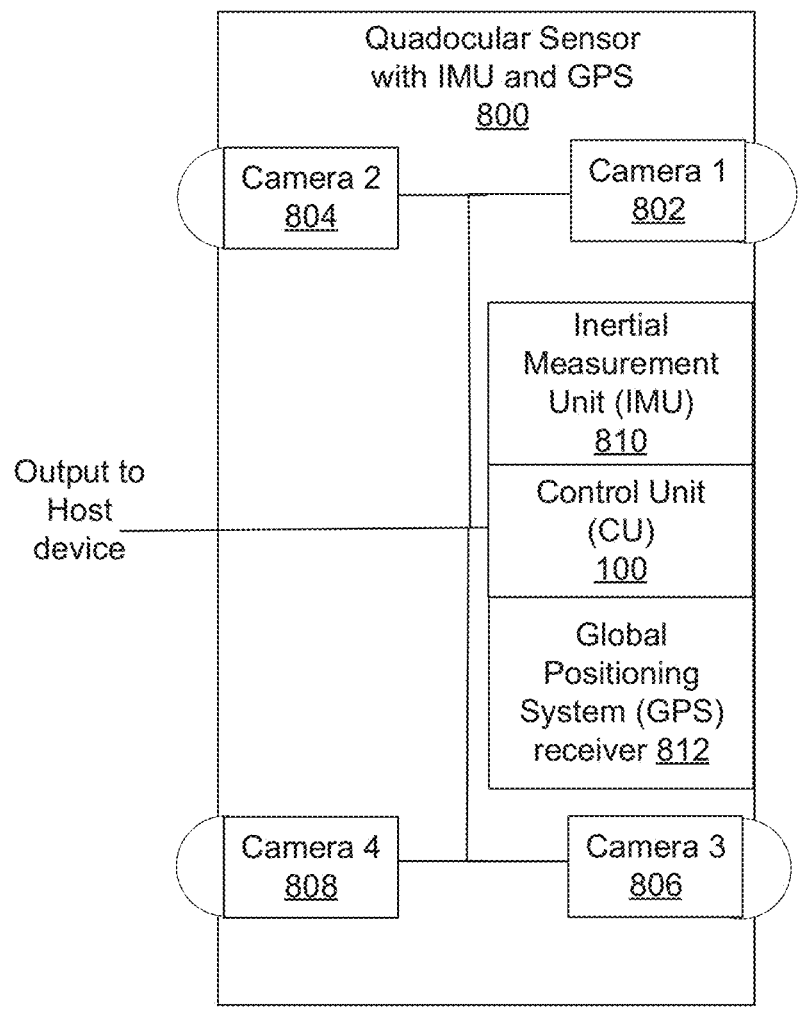
FIG. 8 illustrates an example of a quadocular-auxiliary sensor where an inertial measurement unit and a wheel odometry unit are used as auxiliary sensors.

FIG. 8 illustrates an example of a quadocular-auxiliary sensor 800 for determining positional information where the auxiliary sensors are an inertial measurement unit and a GPS receiver. The quadocular-auxiliary sensor 800 includes four cameras. The four cameras are configured into two back-to-back pairs (camera 1 802 and camera 2 804, camera 3 806 and camera 4 808) and each pair of cameras is placed horizontally with respect to the other. The two front facing cameras, camera 1 802 and camera 3 806, are used to obtain two differing stereoscopic views on a scene in front of the autonomous mobile unit. Likewise, the two back facing cameras, camera 2 804 and camera 4 808, are used to obtain two differing stereoscopic views on a scene at the back of the autonomous mobile unit. The quadocular-auxiliary sensor 800 further includes an Inertial Measurement Unit (IMU) 810, a GPS receiver 812, and a Control Unit (CU) 100. The Control Unit 100 has a USB interface to provide output to a host. Images from cameras 802, 804, 806, 808 are used for agent localization that extracts features from images and to provide raw information for deep learning based tasks, including object recognition, object tracking, image captioning, and the like.

An IMU 810 provides raw sensor data for agent localization pipeline, which consumes IMU data at a high frequency at least 200 Hz to generate agent positional information in real-time. In an implementation, the localization pipeline combines information from IMU 810 which runs at relatively high frequency to provide frequent updates of less accurate information, and cameras 802, 804, 806, 808 which run at relatively lower frequency, 30 Hz, to provide more accurate information with less frequency.

A GPS provider 812 provides a global position estimate at 10 Hz. While GPS is a relatively accurate localization sensor, its update rate is too slow to provide real-time updates. IMU 810 provides a faster update with less accurate results. The IMU 810 propagates the autonomous mobile unit's position every 5 ms, but the error accumulates as time progresses. Therefore, in every 100 ms, a GPS update is received which helps correct the IMU error. Data from the GPS receiver implementations has an accuracy of about one meter. Furthermore, the GPS signal can experience multi-path problems, meaning that the signal may bounce off buildings and introduce more noise. A GPS receiver also benefits from an unobstructed view of the sky and thus is less effective in closed environments.

The Control Unit 100 controls the sensors (IMU 810, GPS receiver 812 and cameras 802, 804, 806, 808), time stamping sensor data from the sensors, performs pre-computation in order to accelerate the localization pipeline, and packages raw data for sending over USB 102 to a host.

The USB interface 102 enables the quadocular-auxiliary sensor 800 to interact with a host. The host (not shown in FIG. 8 for clarity sake) can be a mobile device or a desktop/laptop computer, specialized machine controller, automobile control module, robot controller or the like, that consumes the data generated by the quadocular-auxiliary sensor 800. In various implementations, the host can perform additional computations to achieve agent localization and deep learning tasks. Implementations that perform data pre-processing on low-power CU 100 relieve the host processor (which has a much higher power consumption compared to low-power CU) from performing these tasks. As a result, such implementations achieve increased energy efficiency.

Figure 9:
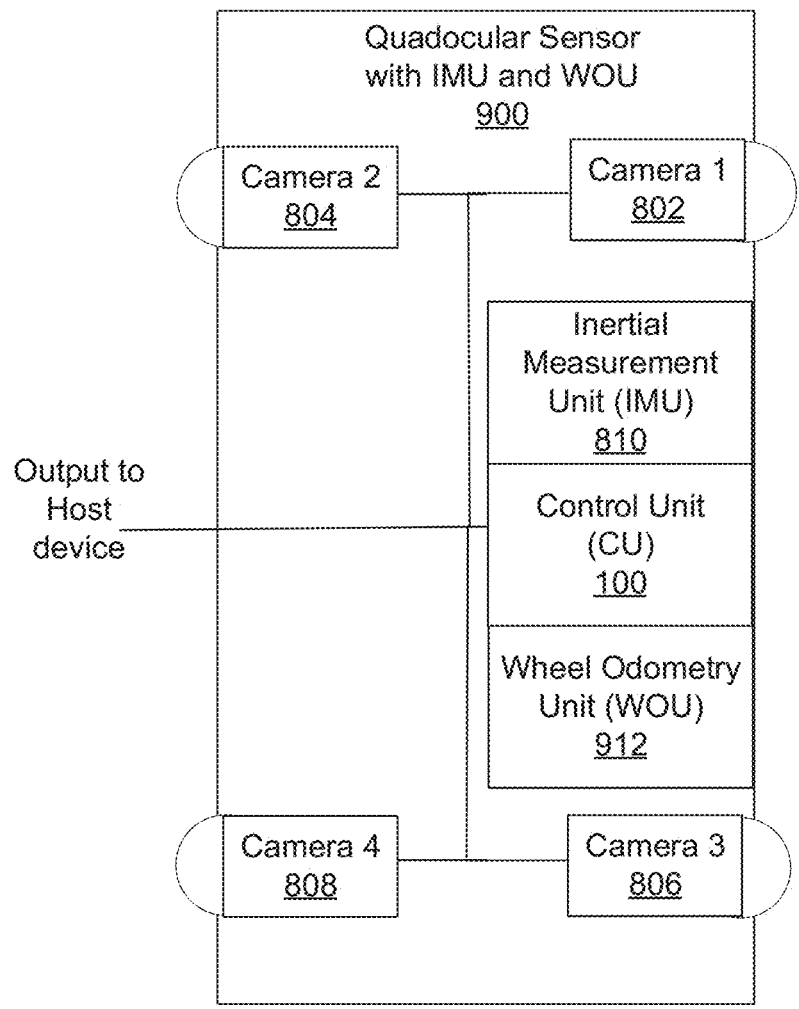
FIG. 9 illustrates an example of a quadocular-auxiliary sensor where an inertial measurement unit and a global positioning system are used as auxiliary sensors.

FIG. 9 illustrates an example of a quadocular-auxiliary sensor 900 where a wheel odometry unit (WOU) 912 is used for determining positional information instead of GPS receiver. A WOU 912 provides raw sensor data for agent localization pipeline from the autonomous mobile unit's wheel rotary encoder to generate agent positional information in real-time.

Figure 10:
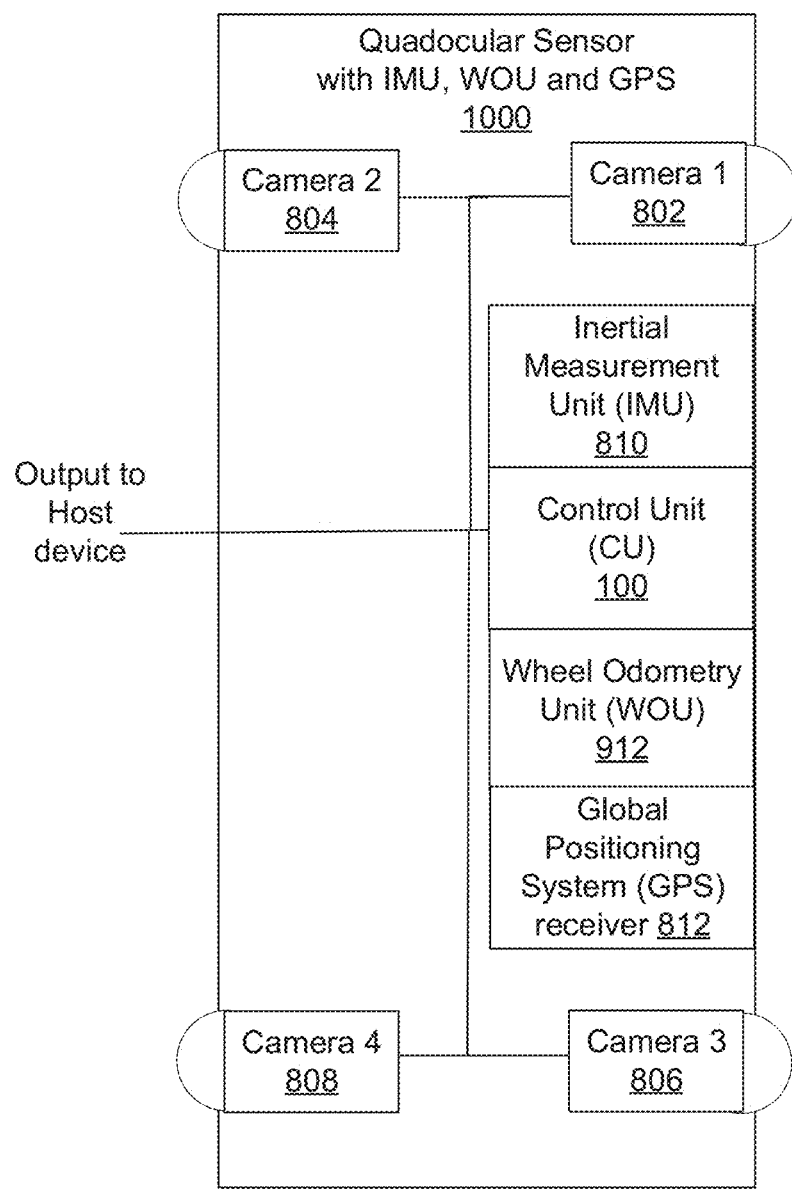
FIG. 10 illustrates an example of a quadocular-auxiliary sensor where an inertial measurement unit, a wheel odometry unit and a global positioning system receiver are used as auxiliary sensors.

FIG. 10 illustrates an example of a quadocular-auxiliary sensor 1000 combined with an inertial measurement unit 810, a GPS receiver 812 and a wheel odometry unit 912. In this embodiment, sensor data from the inertial measurement unit 810, the GPS receiver 812 and the wheel odometry unit 912 are used to calibrate positional data from the camera to determine the position of the autonomous mobile unit on the global map.

Implementations described herein can be utilized for determining positional information of the mobile unit.

Sensor Visual Data Generation and Processing

Artifact Removal:

Dust, dirt or scratches on the camera lenses of the quadocular-auxiliary sensor blocks incoming light before it reaches the visual sensors, and appears as dark spots in images. The presence of these artifacts will result in an image different than the scene in front of the cameras, and affect detection of key features. Image correction of artifacts by artifact removal processor 303 can be used to recreate missing pixel data. Various algorithms used for image correction by artifact removal processor 303 will be readily apparent to those skilled in the art.

Image Undistortion:

The image undistortion processor 304 corrects distortion in the image data in the captured frames. The image distortion is generally referred to an optical aberration that deforms and bends physically straight lines and makes them appear curvy in images. Optical distortion occurs as a result of optical design. To achieve reliable computer vision results, image undistortion processor 304 can undistort the image before further processing is performed. This can be achieved by using a lookup table of the size of the input image and performing a remapping operation to undistort the whole image.

Feature Undistortion:

In cases when the remaining portions of the processing pipeline do not require the whole image, but only the feature points within the image, the feature undistortion processor 308 perform a feature undistortion operation on the CU. In detail, this operation runs after the feature extraction stage and undistorts each feature point.

Feature Detection and Description:

The processor feature detection engine 306 performs feature detection upon image frames using Shi-Tomasi. Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. Some implementations perform the feature detection on the CU 100 to relieve the host from performing such tasks, and to accelerate the feature detection process. A type of feature can be (A) two small Eigen values: feature is not interesting; (B) one small, one big value: feature is likely an edge; (C) two big values: feature is likely a corner; and (D) other type of features. Accordingly, in an implementation, processing includes: (a) action 1: calculate Eigen value of the intensity value of each pixel and its surrounding pixels, and determine (i) whether the feature is of interest; and (ii) for features of interest, a type of feature; and (b) action 2: refine by applying non-maximum suppression, applying spatial binning, applying heuristics or applying other types of refinement.

The feature description engine 310 performs feature description on detected features. The feature description includes methods to identify each detected points in an image uniquely. Feature description can be used to compare and match feature points between different images. Some implementations perform the feature description on the CU 100 to relieve the host from performing such tasks, and to accelerate the feature description process.

One implementation of feature description engine 310 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", http://scikit-image.org/docs/dev/auto_examples/plot_orb.html (last accessed Aug. 17, 2016). For further information on ORB Descriptor, reference may be had to Ethan Rublee, et al., "ORB: an efficient alternative to SIFT or SURF", which is incorporated herein by reference for all purposes.

In some implementations, the feature detection engine 306 and the feature description engine 310 can be combined, as demonstrated in Convolutional Neural Networks (CNNs). A convolution neural network is a type of deep neural network that is widely used in object recognition tasks. A general CNN evaluation pipeline usually consists of the following layers: (i) the convolution layer uses different filters to extract different features from the input image with each filter containing a set of "learnable" parameters that will be derived after the training stage; (ii) the activation layer decides whether to activate the target neuron or not; (iii) the pooling layer reduces the spatial size of the representation to reduce the number of parameters and consequently the computation in the network; and (iv) the fully connected layer connects all neurons to all activations in the previous layer. CNNs have proven very useful in areas such as feature recognition and classification in images from visual sensors. CNNs have managed to identify faces, objects and traffic signs for autonomous robots and vehicles. CNNs are data centric and require heavy computation. In the last few years, increases in available storage and computation capabilities have enabled CNNs to achieve success in supervised perception tasks of key features in images from visual sensors. After training for days or even weeks on a large data set, a CNN can be capable of in real-time perception of key features in images. For example, CNNs have achieved top results with ImageNet Large Scale Visual Recognition Challenge (ILSVRC) dataset, which contains 1-2 million images in over 1000 categories.

In autonomous vehicles, CNNs can be used to perform lane and vehicle detection while running at frame rates required for a real-time system. A labeled data set is required to represent all possible driving environments (rain, snow, night, day, etc.), and scenarios (pedestrian crossing the road, a car in front, mailbox by the side of the road, etc.).

Various versions of CNNs cam be used to implement the technology disclosed herein, e.g. AlexNet, Overfeat CNN, R-CNN, etc.

2D Feature Correspondence Generation:

The optical flow feature correspondence processor 312 performs 2D feature correspondence generation for the features. The feature correspondence computation is used to identify the feature points that appear in both the left and the right cameras. Once feature correspondence is identified for any two feature points, triangulation can be applied to the feature points to derive the depth of the point in space. This depth information is employed by processes later in the localization pipeline. Some implementations perform the feature correspondence generation on the CU 100 to relieve the host from performing such tasks, and to accelerate the feature correspondence generation.

One optical flow feature correspondence processor 312 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes: (a) input: last image, current image, a list of detected feature locations from the last image; (b) output: a list of locations of the last image's detected features' in the current image; (c) assumption: brightness consistency, image changes by and only by motion; (d) action 1: predict the output locations by either just assuming there is no motion so the current locations are the same as last frame's feature locations, OR use information retrieved from the auxiliary sensors to predict the locations; and (e) action 2: refine the pixel coordinate for each feature point by searching around the predicted location, matching patches, and using matching score to determine the refined position. Accordingly, the technology disclosed can provide implementations with the ability to gain increased performance by using information from the auxiliary to narrow the search and save time.

Sensor Data Generation and Processing for the Inertial Measurement Unit

In an embodiment, IMU raw data is corrected on the CU 100, thereby enabling implementations that do not require extra processing from the host processor, therefore accelerating the sensor pre-processing pipeline.

Time Stamping:

The time stamping processor 504 time stamps each set of inertial measurement data that the Control Unit 100 receives from the IMU sensor 810 data, in order to assure that the quadocular-auxiliary sensors 800, 900 and 1000 maintain a temporally accurate stream of sensor data. Such rigorous attention to maintaining the integrity of the sensor data stream enables implementations to provide agent localization that works reliably. Time-stamping raw data by the quadocular-auxiliary sensor obviates the need for complex synchronization tasks.

Bias Correction:

The bias correction processor 506 corrects IMU data readout from the timestamped inertial data. Due to manufacturing imperfections, IMU sensors usually have bias problems such that its measurements contain errors. A bias error, if not removed from the measurement, is integrated twice as part of the mechanization process. In this case, a constant bias (error) in acceleration becomes a linear error in velocity and a quadratic error in position. A constant bias in attitude rate (gyro) becomes a quadratic error in velocity and a cubic error in position. The bias can be derived from the offline factory sensor calibration stage. This calibration information in CU 100 to perform bias correction task on CU 100.

Scale Correction:

The scale correction processor 508 applies stored scale factor information to the corrected inertial data. Scale factor error is the relation between input and output. If the input is 100%, the expected output is 100%. The actual output is the result of a linear effect, where the output is proportional to the input but scaled. For example, if the input is 10 m/s2, but there is a 2% scale factor error, the output measurement is 10.2 m/s2. The scale factor can be derived from the offline factory sensor calibration stage. This calibration information in CU 100 to perform scale correction task on CU 100.

Misalignment Correction:

The mis-alignment correction processor 510 corrects misalignments of sensory elements of the inertial measurement sensor. There is a 3-axis gyroscope and a 3-axis accelerometer mounted orthogonal to each other. The mountings, however, have errors and so are not perfectly at 90 degrees. This leads to a correlation between sensors. For example, assume one axis is pointed perfectly up and the IMU is level. The accelerometer on this axis is measuring gravity. If the other two axes were perfectly orthogonal, they do not measure any of the effect of gravity. If there is a non-orthogonality, the other axes also measure gravity, leading to a correlation in the measurements. The effect of non-orthogonality occurs within sensor sets (between accelerometers or gyroscopes), between sensor sets or between the sensor sets and the enclosure (package misalignment). Careful manufacturing, as well as factory calibration, can help minimize this error source. Continuous estimation and correction during system operation is also an approach used to minimize this effect. Package misalignment (between the IMU 810 and the enclosure) can be removed by performing a bore-sighting estimation to determine the offset between the IMU 810 measurement frame and the sensor (objective) frame. The misalignment numbers can be derived from the offline factory sensor calibration stage. This calibration information in CU 100 to perform misalignment correction task on CU 100.

IMU-Camera Coordinate Transformation:

In some implementations, the IMU 810 and the cameras 802, 804, 806 and 808 do not reside at the same physical location; there is a distance between the IMU 810 and the cameras 802, 804, 806 and 808. Accordingly, in order to enable later processes in the localization pipeline to treat the IMU 810 and the cameras 802, 804, 806 and 808 as being co-located, on implementation determines a transformation matrix between the IMU 810 and the cameras 802, 804, 806 and 808, which can be achieved from an offline production or post-production calibration stage. In CU 100, this transformation matrix is stored locally, and applied to the IMU data. This technique enables later processes to be able to treat the IMU 810 and the cameras 802, 804, 806 and 808 to be co-located Sensor Data Generation and Processing for the Wheel Odometry Unit In an embodiment, WOU raw data is corrected on the CU 100, thereby enabling implementations that do not require extra processing from the host processor, therefore accelerating the sensor pre-processing pipeline.

Time Stamping:

The time stamping processor 604 time stamps each set of odometry measurement data that the Control Unit 100 receives from the WOU sensor 912 data, in order to assure that the quadocular-auxiliary sensors 800, 900 and 1000 maintain a temporally accurate stream of sensor data. Time-stamping raw data by the quadocular-auxiliary sensor obviates the need for complex synchronization tasks.

Slippage Adjuster:

When driving over low-traction terrain, deformable terrain, steep hills, or during collisions with obstacles, the position of the quadocular-auxiliary sensor with WOU as an auxiliary unit can quickly accumulate large errors due to wheel slippage. With inaccurate odometry data, the autonomous mobile unit's final position can be overestimated. The slippage adjuster 606 corrects slippage related inaccuracy from the timestamped odometry data.

Scale Correction:

The scale correction processor 608 applies stored scale factor information to the corrected odometry data. Scale factor error is the relation between input and output. If the input is 100%, the expected output is 100%. The actual output is the result of a linear effect, where the output is proportional to the input but scaled. For example, if the input is 1 cm, but there is a 5% scale factor error, the output measurement is 1.05 cm. The scale factor can be derived from the offline factory sensor calibration stage. This calibration information in CU 100 to perform scale correction task on CU 100.

Sensor Data Generation and Processing for the Global Positioning System Receiver In an embodiment, geolocation raw data is corrected on the CU 100, thereby enabling implementations that do not require extra processing from the host processor, therefore accelerating the sensor pre-processing pipeline.

Time Stamping:

The time stamping processor 704 time stamps each set of geolocation data that the Control Unit 100 receives from the GPS receiver 812, in order to assure that the quadocular-auxiliary sensors 800, 900 and 1000 maintain a temporally accurate stream of sensor data. Time-stamping raw data by the quadocular-auxiliary sensor obviates the need for complex synchronization tasks.

Coordinate Transformation:

The GPS receiver may receive geolocation of the autonomous mobile unit in North-East down (NED) coordinate format or Earth-Centered, Earth-Fixed (ECEF) coordinate format. The coordinate transformation processor 706 has the capability of translating any one of the geolocation coordinate system formats of the GPS receiver to the one used by the autonomous mobile unit and vice versa.

Figure 11:
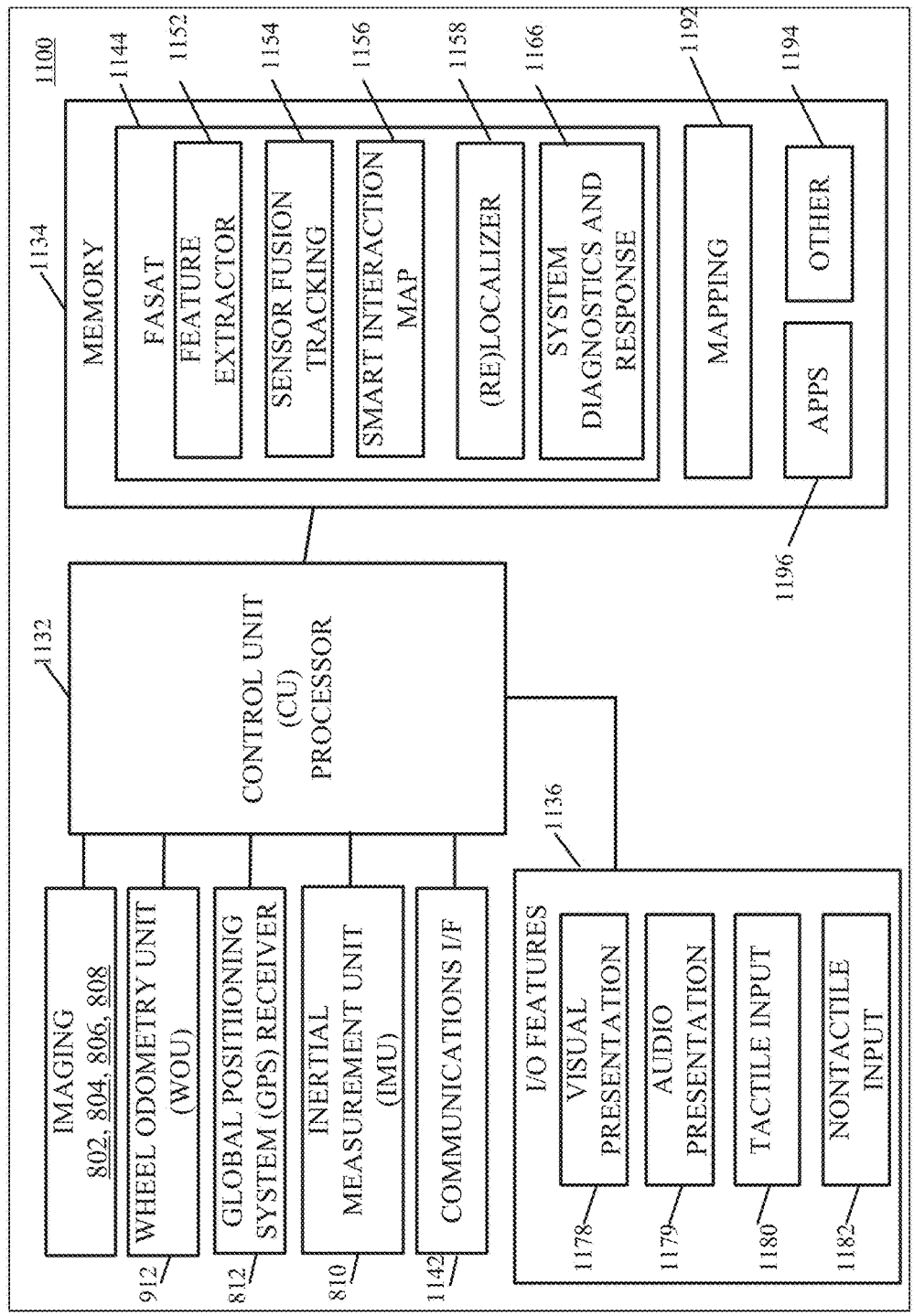
FIG. 11 illustrates an example of a quadocular-auxiliary sensory system.

Referring now to FIG. 11, which shows a simplified block diagram of a quadocular-auxiliary positioning system 1100 which can be used to implement quadocular-auxiliary sensors 800, 900 and 1000. Quadocular-auxiliary positioning system 1100 includes a processor 1132, a memory 1134, an inertial measurement unit (IMU) 810, a wheel odometry unit (WOU) 912, a global positioning system (GPS) receiver 812, cameras 802, 804, 806 and 808, and a communications interface 1142. One or more additional I/O features 1136 are included to address implementation specific needs, such as a visual presentation interface 1178, an audio presentation interface 1179, sensor(s) for detecting tactile input (e.g., keyboards, keypads, touchpads, mouse, trackball, joystick and the like) 1180, and non-tactile input (e.g., microphone(s), sonar sensors and the like) 1182. Memory 1134 can be used to store instructions to be executed by processor 1132 as well as input and/or output data associated with execution of the instructions. In particular, memory 1134 contains instructions, conceptually illustrated as a group of modules described in greater detail below, that control the operation of processor 1132 and its interaction with the other hardware components. An operating system directs the execution of low-level, basic system functions such as memory allocation, file management and operation of mass storage devices. The operating system may be or include a variety of operating systems such as Microsoft WINDOWS™ operating system, the Unix™ operating system, the Linux™ operating system, the Xenix™ operating system, the IBM AIX™ operating system, the Hewlett Packard UX™ operating system, the Novell NETWARE™ operating system, the Sun Microsystems SOLARIS™ operating system, the OS/2™ operating system, the BeOS™ operating system, the MACINTOSH™ operating system, the APACHE™ operating system, an OPENACTION™ operating system, iOS™, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

In an embodiment, the processor 1132 is a NEON ARM processor implementing a single input-multiple data (SIMD) architecture as a reduced instruction set computer (RISC) architecture. Depending on implementation, however, processor 1132 can alternatively be a realized using a specific purpose microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that are capable of implementing the actions of the processes of the technology disclosed.

Communications interface 1142 can include hardware and/or software that enables communication between quadocular-auxiliary positioning system 1100 and other systems controlling or enabling customer hardware and applications (hereinafter, a "host system" or "host") such as for example, a robot or other guided mobile platform, an autonomous vehicle, a virtual reality-augmented reality wearable device (VR/AR headset) or the like (not shown in FIG. 11 for clarity sake). Cameras 802, 804, 806 and 808, as well as sensors such as IMU 810, GPS receiver 812 and WOU 912, can be coupled to processor 1132 via a variety of communications interfaces and protocols implemented by hardware and software combinations. Thus, for example, positioning system 1100 can include one or more camera data ports and/or motion detector ports (not shown in FIG. 11 for clarity sake) to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a fast accurate stable adaptive tracking ("FASAT") process 1144 executing on processor 1132. In some implementations, quadocular-auxiliary positioning system 1100 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 1132, which may in turn be generated in response to user input or other detected events.

Instructions defining FASAT process 1144 are stored in memory 1134, and these instructions, when executed, perform analysis on image frames captured by the cameras 802, 804, 806 and 808, inertial data captured by the IMU 810, geolocation data from the GPS receiver 812 and the odometry data captured by the WOU 912 connected to quadocular-auxiliary positioning system 1100. In one implementation, FASAT process 1144 includes various logical processes, such as a feature extractor 1152 that receives a raw image and determines a salient points' representation of objects in the image thereby representing the geometry understanding of the objects from a machine's perspective view. In some implementations, feature extractor 1152 analyzes images (e.g., image frames captured via cameras 802, 804, 806 and 808) to detect edges of an object therein and/or other information about the object's location. A sensor fusion tracking process 1154 uses feature extraction results, inertial data from the IMU 810, geolocation data from the GPS receiver 812 and odometry data from the WOU 912 to generate pose accurately and rapidly. A smart interaction map 1156 enables using a known map of obstructions to localize the sensor. The map is built using mapping functionality of mapping process 1192, which is described in further detail herein below. A Re-localizer process 1158 recovers device positional awareness when the device has lost track of device position. A system diagnostic and response (SDAR) 1166 manages of current localizing state of the device and provide response strategy.

A mapping process 1192 generates a hybrid occupancy grid that maps the space and objects recognized by the feature extractor 1152. The hybrid occupancy grid includes (i) a point cloud representation of points in space located in the image frames and (ii) one or more x-y plane occupancy grids arranged at heights to intersect points on the extracted features.

In some implementations, other processing 1194 analyzes audio or ultrasonic signals (e.g., audio signals captured via sonar or audio sensors comprising non-tactile input 1182) to localize objects and obstructions by, for example, time distance of arrival, multilateration or the like ("Multilateration is a navigation technique based on the measurement of the difference in distance to two or more stations at known locations that broadcast signals at known times. See Wikipedia, at <http://en.wikipedia.org/w/index.php?title=Multilateration&oldid=523281858>, on Nov. 16, 2012, 06:07 UTC). Audio signals place the object on a known surface, and the strength and variation of the signals can be used to detect object's presence. If both audio and image information is simultaneously available, both types of information can be analyzed and reconciled to produce a more detailed and/or accurate path analysis.

In some implementations, other processing 1194 determines paths to track and predict device movements in space based upon the hybrid occupancy grid generated by mapping process 1192. One or more applications 1196 can be loaded into memory 1134 (or otherwise made available to processor 1132) to augment or customize functioning of the quadocular sensors thereby enabling the system 1100 to function as a platform. Successive camera images are analyzed at the pixel level to extract object movements and velocities. In some implementations, presentation interface 1178 includes a video feed integrator provides integration of live video feed from the cameras 802, 804, 806 and 808, and one or more virtual objects. Video feed integrator governs processing of video information from disparate types of cameras. For example, information received from pixels that provide quadochromatic imaging and from pixels that provide color imaging (e.g., RGB) can be separated by integrator and processed differently. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user.

Presentation interface 1178, audio presentation 1179, non-tactile input 1182, and communications interface 1142 can be used to facilitate user interaction via a quadocular sensor with quadocular-auxiliary positioning system 1100. These components can be of highly customized design, generally conventional design or combinations thereof as desired to provide any type of user interaction. In some implementations, results of analyzing captured images using inertial measuring unit 810, GPS receiver 812, wheel odometry unit 912 and cameras 802, 804, 808, 810 and FASAT program 1144 can be interpreted as representing objects and obstacles in 3D space. For example, a robot equipped with quadocular-auxiliary sensor can perform path planning and/or obstacle avoidance across a surface that has been analyzed using FASAT program 1144, and the results of this analysis can be interpreted as an occupancy map by some other program executing on processor 1132 (e.g., a motion planner, localization and tracking process, or other application). Thus, by way of illustration, a robot might use sweeping of its cameras across a room in order to "map" a space currently imaged to a hybrid point grid that can be used by a host device such as a monitor, VR headset or the like via presentation interface 1178, to provide visual input of the area that the robot is "seeing". Smart interaction map 1156 may use the representation of space built by mapping 1192 to plan a path for a robot or mobile platform through the space, e.g., to improve localization and tracking of the robot or platform through the space.

It will be appreciated that the quadocular-auxiliary positioning system 1100 is illustrative and that variations and modifications are possible. Quadocular-auxiliary positioning systems can be implemented in a variety of form factors, including "cloud" computing systems of servers and networks, desktop systems, laptop systems, tablets, smart phones or personal digital assistants, and so on. A particular implementation may include other functionality not described herein for clarity sake. In some implementations, one or more cameras and two or more microphones may be built into the quadocular-auxiliary system 1100 or may be supplied as separate components. Further, an image or audio analyzer can be implemented using only a subset of quadocular-auxiliary positioning system 1100 components (e.g., as a processor executing program code, an ASIC, or a fixed function digital signal processor, with suitable I/O interfaces to receive image data and output analysis results).

While quadocular-auxiliary positioning system 1100 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of feature extractor 1152 by processor 1132 can cause processor 1132 to operate inertial measurement unit 810, GPS receiver 812 and cameras 802, 804, 806, 808 to capture images and/or audio signals of an object traveling across and in contact with a surface to detect its entrance by analyzing the image and/or audio data.

Tracking

Tracking refers to capabilities rendered by system hardware and functional processes that enable a controlled device (robot, mobile platform, autonomous vehicles, or other hardware) to localize itself and have positional awareness continuously, e.g. the sensor system can determine where it is in the real world.

Architecture for Tracking System

Figure 12:
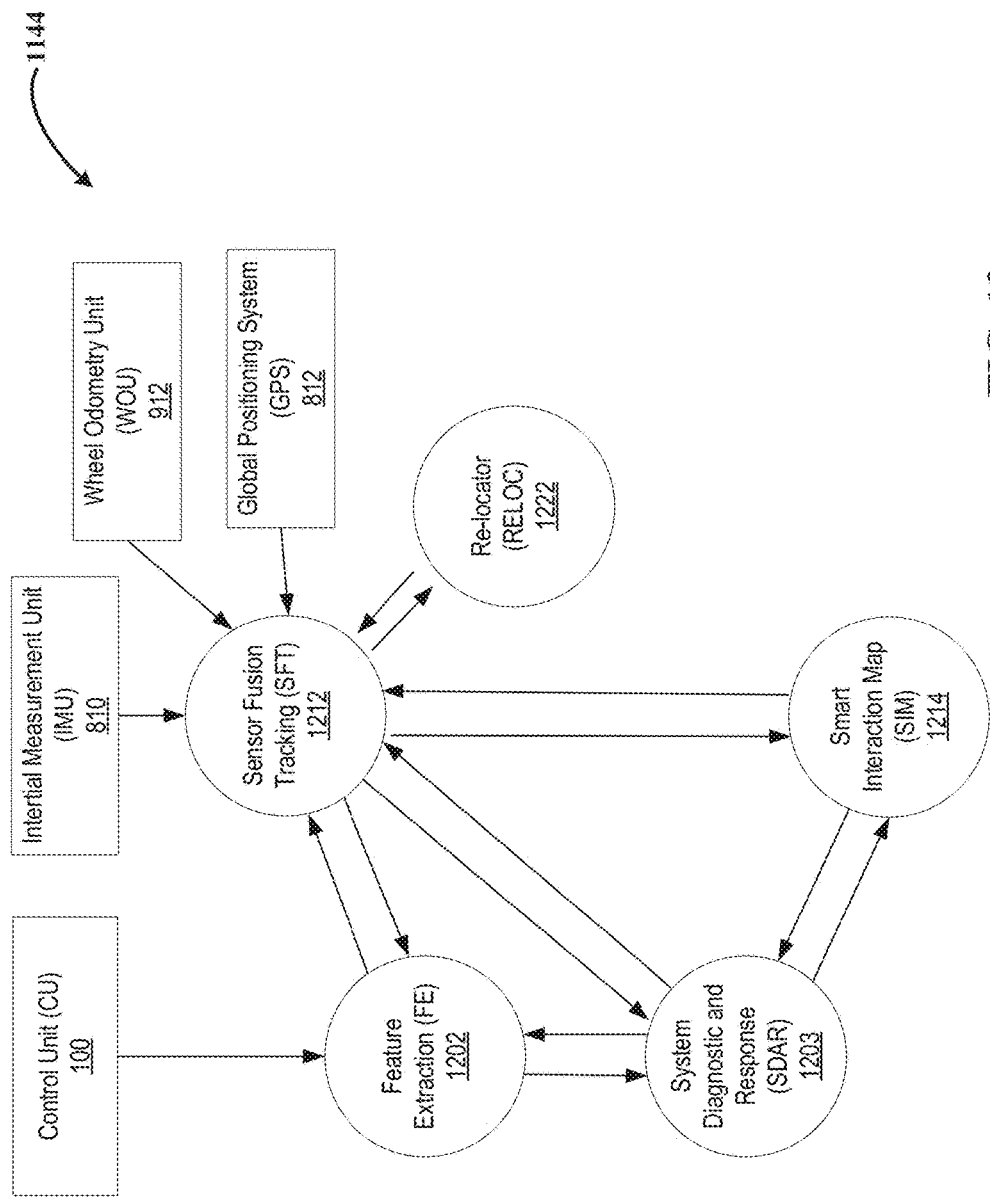
FIG. 12 illustrates an example tracking system implementing the tracking process.

FIG. 12 illustrates example architecture for a tracking system implementation. As shown in FIG. 12, components and information flow between components of an example fast, accurate, stable adaptive tracking ("FASAT") process 1144 of FIG. 11 are illustrated by feature extractor (FE) 1202, sensor fusion based tracker (SFT) 1212, smart interaction with map (SIM) processor 1214, a system diagnostics and response (SDAR) processor 1203 and a Re-locator (RELOC) 1222. The data flow and operation of one example implementation of these components will next be described.

Feature Extraction

A feature extractor (FE) 1202 represents the geometric understanding of an environment from an autonomous mobile unit's perspective view. Feature extractor 1202 receives raw image information from Control Unit 100 and provides a propagated pose of the autonomous mobile unit to a sensor fusion tracker (SFT) 1212. One implementation of a feature extractor 1202 performs a variety of actions including image preprocessing, feature detection, and feature descriptor preparation. Image processing tasks also include performing artifact removal and Gaussian blur and gamma correction on raw image data.

Feature Detection: Optical Flow

Optical flow gives 2D-2D correspondence between previous image and a current image. Feature extractor 1202 generates a hierarchy of levels; each level generation is aligned with optical flow needs, and therefore need only be computed once.

Processed images are stored in a multiple hierarchical patch and/or undistorted patch. In an example implementation, as levels in the hierarchy increase, the more blur exists in the image. At each level in the hierarchy, the size of the image is reduced to ¼ of the size of the image from which it is derived, e.g. the size of the image in the previous level. For example, if an image on the first ("zero level") has a size 640×480, then the size of the corresponding image on the next higher level ("first level") has a size 320×240, and a next corresponding image at the next higher level ("second level") has a size 160×120. If the same feature point appears at more than one level, then that feature point is determined by the system to be a strong feature point. In the foregoing example, a scale factor of 2 is used. However, any scale factor can be selected, e.g., a scale factor of 1.6 provides the original 640×480 image with a next level image having a resolution of 400×300.

One feature extractor 1202 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes: (a) input: last image, current image, a list of detected feature locations from the last image; (b) output: a list of locations of the last image's detected features' in the current image; (c) assumption: brightness consistency, image changes by and only by motion; (d) action 1: predict the output locations by either just assuming there is no motion, so the current locations are the same as last frame's feature locations, OR use information retrieved from one or more auxiliary sensors to predict the locations; and (e) action 2: refine the pixel coordinate for each feature point by searching around the predicted location, matching patches, and using a matching score to determine the refined position. Accordingly, the technology disclosed can provide implementations with the ability to gain increased performance by using information from one or more auxiliary sensors to narrow the search and save time.

Feature Detection:

One implementation of feature extraction processor 1202 uses NEON-accelerated Shi-Tomasi feature detection with spatial binning in order to obtain features from regions to cover as much as possible for the full image. The feature extractor 1202 uses data from one or more auxiliary sensors and the pose information received from sensor fusion tracker 1212 in order to dynamically decide the regions to track and the parameters to use. Features are "interesting" parts of an image. A type of feature can be (A) two small Eigen values: feature is not interesting; (B) one small, one big value: feature is likely an edge; (C) two big values: feature is likely a corner; and (D) other type of features. Accordingly, in an implementation, processing includes: (a) action 1: calculate Eigen value of the intensity value of each pixel and its surrounding pixels, and determine (i) whether the feature is of interest; and (ii) for features of interest, a type of feature; and (b) action 2: refine by applying non-maximum suppression, applying spatial binning, applying heuristics or applying other types of refinement.

Feature Descriptor:

One implementation of feature extractor 1202 uses a SIMD-accelerated ORB descriptor to describe features. The description of a feature can be used for matching purposes and describe a feature's uniqueness. The ORB descriptor approach was selected for its relative rotational invariance and immunity to Gaussian image noise. One example of an ORB feature detector and binary descriptor can be found at "ORB feature detector and binary descriptor", http://scikit-image.org/docs/dev/auto_examples/plot_orb.html (last accessed Aug. 17, 2016). For further information on ORB Descriptor, reference may be had to Ethan Rublee, et al., "ORB: an efficient alternative to SIFT or SURF", which is incorporated herein by reference for all purposes.

Combined Feature Detection and Descriptor:

In some implementations, the feature detection engine 306 and the feature description engine 310 can be combined, as demonstrated in Convolutional Neural Networks (CNNs). A convolution neural network is a type of deep neural network that is widely used in object recognition tasks. A general CNN evaluation pipeline usually consists of the following layers: (i) the convolution layer uses different filters to extract different features from the input image with each filter containing a set of "learnable" parameters that will be derived after the training stage; (ii) the activation layer decides whether to activate the target neuron or not; (iii) the pooling layer reduces the spatial size of the representation to reduce the number of parameters and consequently the computation in the network; and (iv) the fully connected layer connects all neurons to all activations in the previous layer. CNNs have proven very useful in areas such as feature recognition and classification in images from visual sensors. CNNs have managed to identify faces, objects and traffic signs for autonomous robots and vehicles. CNNs are data centric and require heavy computation. In the last few years, increases in available storage and computation capabilities have enabled CNNs to achieve success in supervised perception tasks of key features in images from visual sensors. After training for days or even weeks on a large data set, a CNN can be capable of in real-time perception of key features in images. For example, CNNs have achieved top results with ImageNet Large Scale Visual Recognition Challenge (ILSVRC) dataset, which contains 1-2 million images in over 1000 categories.

Bag-of-Words

One implementation of feature extractor 1202 performs bag-of-words extraction, determining from one image a byte array, sparse histogram over vocabulary. Accordingly, in an implementation, Bag-of-words processing includes using a list of feature descriptors in one image to extract Bag-of-words feature for one image. For example, in an image having 400 features with 400 corresponding descriptors, and a bag-of-word feature with the size of 256 bits. The resulting Bag-of-words is a 256-bit array, and one image only needs/has one 256 bit array. Bag-of-words is useful in performing relocalization as described herein below in further detail. Bag-of-words can indicate among A, B, C images, an image D has a matching score individually D-A, D-B, D-C. Say for example that D-B has the highest score, and then the camera taking image D is closest to the camera pose used when taking image B, not A or C.

One implementation of feature extractor 1202 adaptively adjusts a threshold that is applied to a number of features needed in order for the system to keep track of a moving object. Such intelligent thresholds include a threshold that is adaptively adjusted based upon device movement, sensor readings, situational or environmental variables (e.g., low light, fog, bright light, and so forth) or combinations thereof. Once sufficient number of features (e.g., above the threshold) are identified, the system will continue to track an object. Otherwise, the system does not track the object. Feature extractor 1202 will adaptively adjust the threshold based on device movement and other sensor levels.

SFT: Generating Pose Information from Feature Extraction Results and Data from Auxiliary Sensors Sensor fusion based tracker (SFT) 1212 determines how to smartly use feature extraction results and data from one or more auxiliary sensors (IMU 810, WOU 912, GPS receiver 812) to generate pose accurately and rapidly. Sensor fusion based tracker 1212 performs initialization for the system state, feature extractor initial state, interaction with map state, and other states. Sensor fusion based tracker 1212 has logic to decide how to initialize the state including use how many images to skip, and any other initialization steps for specific hardware.

In an implementation, sensor fusion based tracker 1212 performs buffer management for the auxiliary sensors. Timestamps of the data from the auxiliary sensors are corrected and aligned. Additionally, data information from the auxiliary sensors that have not been processed yet is maintained in a buffer.

Generating Pose Information for a Quadocular-Auxiliary Sensor where an IMU and a GPS Receiver are Used as the Auxiliary Sensors Propagation: In a quadocular-auxiliary sensor with two auxiliary sensors, an intermediate propagated pose is estimated using first propagated pose from image information together with second propagated pose from data from one auxiliary sensor. A third propagated pose is estimated from the second auxiliary sensor. A final pose is estimated from the intermediate pose and the third propagated pose. Those of ordinary skill in the art will recognize a variety of equivalent variations. In an implementation, an IMU can be the first auxiliary sensor while a GPS receiver can be a secondary auxiliary sensor.

Implementations can employ extended Kalman filtering (EKF), to extrapolate the second propagated pose using inertial data from the multi-axis IMU. Propagation by the IMU can be performed in a number of ways: (i) the propagation happens right after an inertial measurement taken by the IMU arrives; or (ii) delayed propagation happens in a batch right after an image taken by the visual sensors arrives but before the update procedure described below is performed.

In some implementations, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

The GPS receiver supplies the Control Unit the new geolocation of the autonomous mobile unit. The GPS receiver can provide position, velocity, and covariance information in North-east down (NED) format, or Doppler, pseudo ranges, and covariance information in Earth-centered, Earth-fixed (ECEF) format. Propagation by the GPS receiver can be performed right after a new geolocation arrives from the satellite.

Update: In an implementation, an update process is performed using image information together with IMU and GPS receiver buffer samples. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

Figure 13:
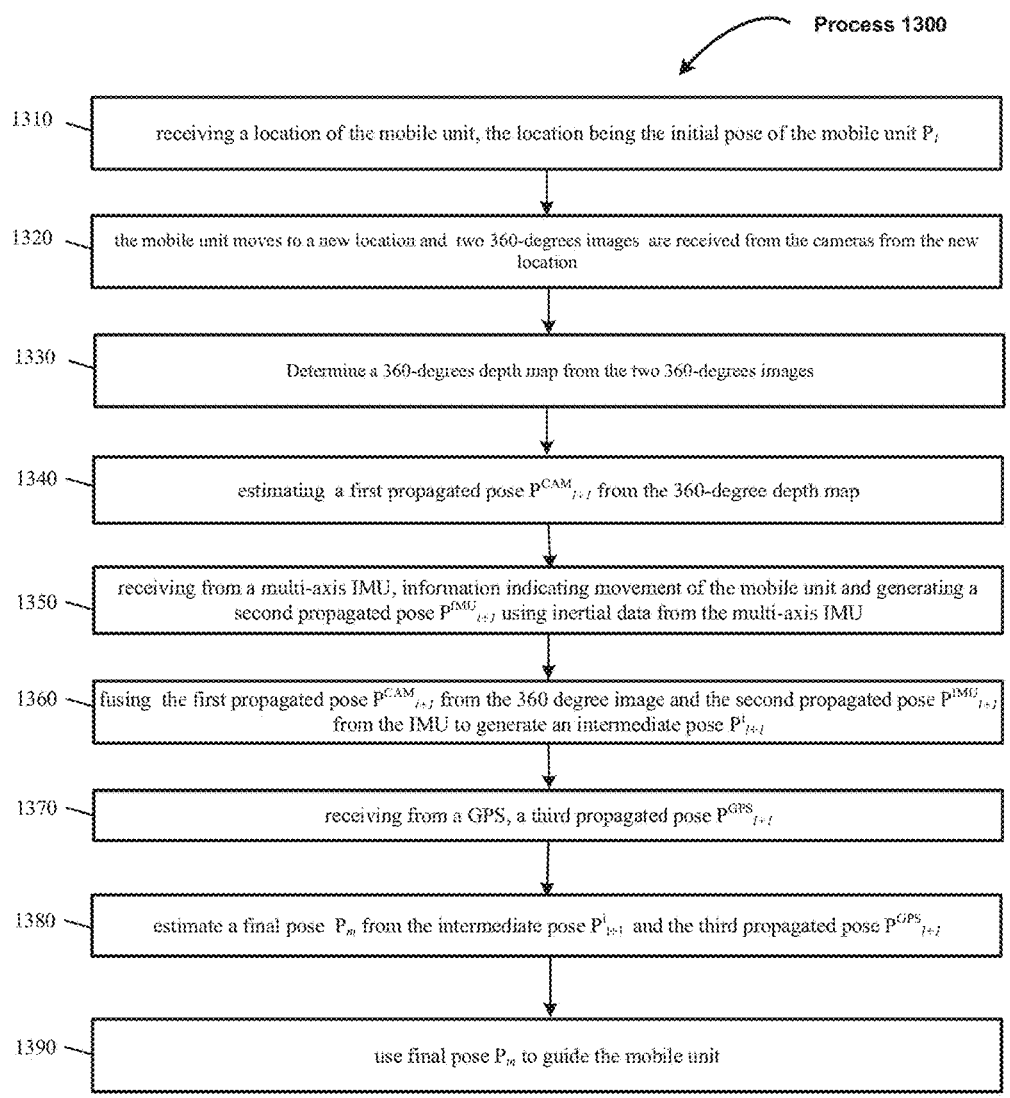
FIG. 13 is a representative method of updating a position of an autonomous mobile unit that includes cameras, a multi-axis inertial measuring unit and a wheel odometry unit.

FIG. 13 is a representative method 1300 of updating a position of an autonomous mobile unit that includes two or more cameras proving a 360-degrees view, a multi-axis inertial measuring unit, and a GPS receiver. Flowchart 1300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, autonomous vehicle, etc.

At step 1310, a location of an autonomous mobile unit is received. Let $P_I$ be the initial pose of the autonomous mobile unit.

At step 1320, the autonomous mobile unit moves to a new location, and two new frames with 360-degrees views are captured by the two back-to-back pairs of cameras at the new location.

At step 1330, a 360-degrees depth map is determined from the two 360-degrees views.

At step 1340, a first propagated pose, $P^{CAM}_{I+1}$, is estimated from the 360-degrees depth map.

At step 1350, information is received from the IMU and a second propagated pose, $P^{IMU}_{I+1}$, is estimated from the inertial data from the IMU.

At step 1360, the first propagated pose $P^{CAM}_{I+1}$ from the 360-degree image frame, and the second propagated pose $P^{IMU}_{I+1}$ from the IMU is fused to generate an intermediate pose $P^i_{I+1}$ with extended Kalman filtering (EKF).

At step 1370, a third propagated pose $P^{GPS}_{I+1}$ is received from the GPS receiver.

At step 1380, a final pose $P_m$ is estimated from the intermediate pose $P^i_{I+1}$ and the third propagated pose $P^{GPS}_{I+1}$ with extended Kalman filtering (EKF).

At step 1390, the final pose $P_m$ is used to guide the autonomous mobile unit.

Other implementations of the method described in this section can include a non-transitory computer readable storage medium storing instructions executable by a processor to perform any of the methods described above. Yet another implementation of the method described in this section can include a system including one or more memory and one or more processors operable to execute instructions, stored in the memory, to perform any of the methods described above.

In some implementations, the IMU may fail to provide inertial data, and the intermediate pose is determined using the first propagated pose from the images. In some implementations, one or more cameras in the multi-ocular system might fail, resulting in an image without a 360-degrees view. A first propagated pose is estimated from remaining operational cameras. In some implementations, all the cameras can fail in the multi-ocular system and data from the IMU is used to determine the intermediate propagated pose. In some implementations, the GPS receiver may fail to provide geolocation data, and the intermediate propagated pose can be used as the final pose.

Generating Pose Information for a
Quadocular-Auxiliary Sensor where an IMU and a
WOU are Used as the Auxiliary Sensors Propagation: In a quadocular-auxiliary sensor with two auxiliary sensors, an intermediate propagated pose is estimated using first propagated pose from image information together with second propagated pose from data from one auxiliary sensor. A third propagated pose is estimated from the second auxiliary sensor. A final pose is estimated from the intermediate pose and the third propagated pose. Those of ordinary skill in the art will recognize a variety of equivalent variations. In an implementation, an IMU can be the first auxiliary sensor while a wheel odometry unit can be a secondary auxiliary sensor.

Implementations can employ extended Kalman filtering (EKF), to extrapolate the second propagated pose using inertial data from the multi-axis IMU. Propagation by the IMU can be performed in a number of ways: (i) the propagation happens right after an inertial measurement taken by the IMU arrives; or (ii) delayed propagation happens in batch right after an image taken by the visual sensors arrives but before the update procedure described below is performed.

In some implementations, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

The autonomous mobile unit has two wheels which are positioned parallel to each other and equidistant from the center of the mobile unit. The wheels can move forward or backward. The wheels are attached to a rotary encoder, which determines if either wheel has traveled one "unit" forward or reverse along the surface. This unit is the ratio of the circumference of the wheel to the resolution of the encoder. The distance traveled by the mobile unit can be computed from the number of units traveled and the circumference of its wheels. In the case where one wheel is allowed to rotate, while the other remains stationary, the magnitude of the change of position of the center of the robot can be determined using the law of sines. If the left wheel were to move forward one unit while the right wheel remained stationary, then the right wheel acts as a pivot, and the left wheel traces a circular arc in the clockwise direction. If the right wheel were to move forward one unit while the left wheel remained stationary, then the left wheel acts as a pivot, and the right wheel traces a circular arc in the anti-clockwise direction.

Propagation by the WOU can be performed in a number of ways: (i) the propagation happens right after an odometry measurement taken by the WOU arrives; or (ii) delayed propagation happens in a batch right after an image taken by the visual sensors arrives but before the update procedure described below is performed.

Update: In an implementation, an update process is performed using image information together with IMU and WOU receiver buffer samples. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

Figure 14:
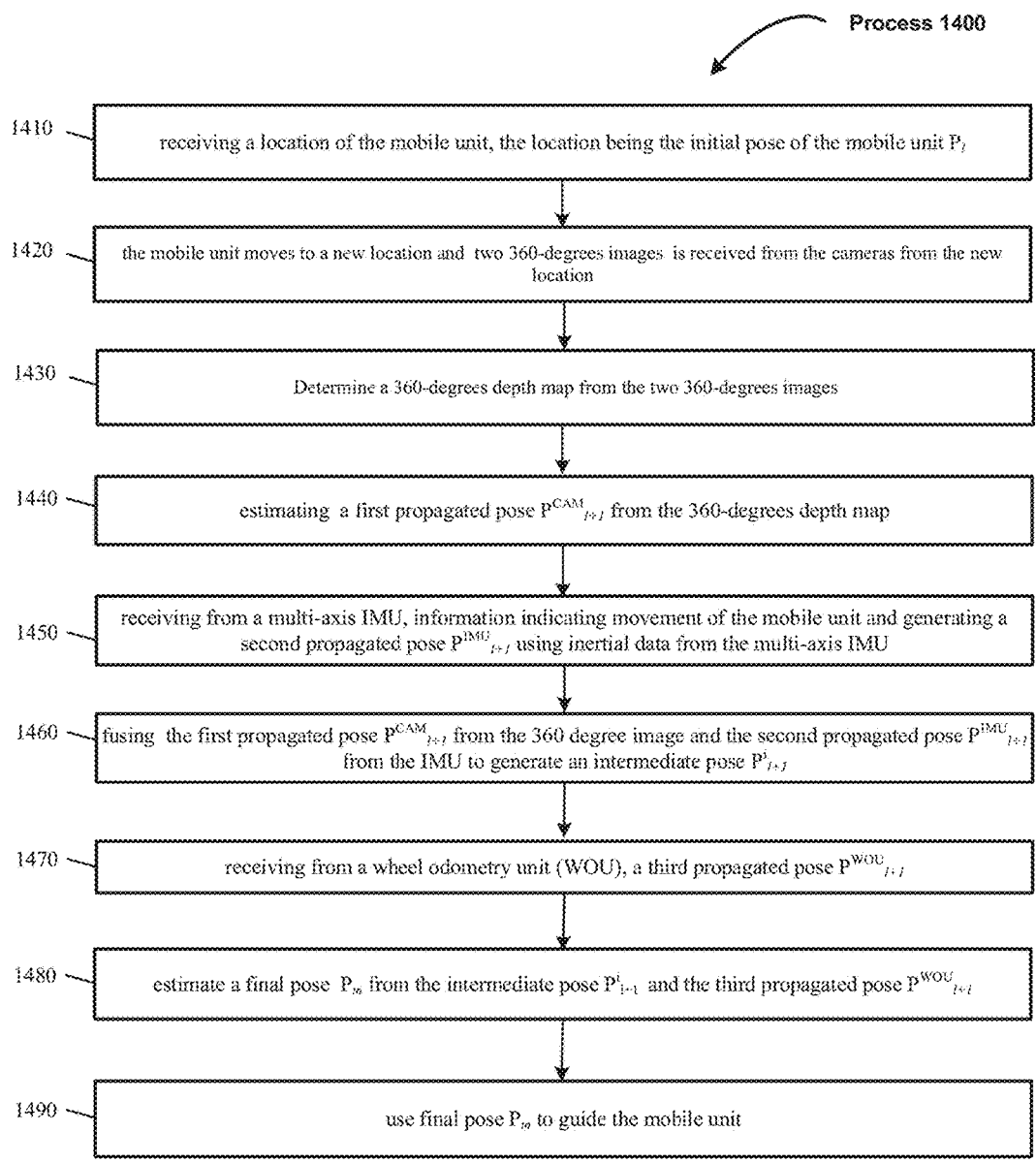
FIG. 14 is a representative method of updating a position of an autonomous mobile unit that includes cameras, a multi-axis inertial measuring unit and a global positioning system.

FIG. 14 is a representative method 1400 of updating a position of an autonomous mobile unit that includes two or more cameras proving a 360-degrees view, a multi-axis inertial measuring unit, and a wheel odometry unit. Flowchart 1400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 14. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, autonomous vehicle, etc.

At step 1410, a location of an autonomous mobile unit is received. Let $P_I$ be the initial pose of the autonomous mobile unit.

At step 1420, the autonomous mobile unit moves to a new location, and two new frames with 360-degrees views are captured by the two back-to-back pairs of cameras at the new location.

At step 1430, a 360-degrees depth map is determined from the two 360-degrees views.

At step 1440, a first propagated pose, $P^{CAM}_{I+1}$, is estimated from the 360-degrees depth map.

At step 1450, information is received from the IMU and a second propagated pose, $P^{IMU}_{I+1}$, is estimated from the inertial data from the IMU.

At step 1460, the first propagated pose $P^{CAM}_{I+1}$ from the 360-degrees image frame and the second propagated pose $P^{IMU}_{I+1}$ from the IMU is fused to generate an intermediate pose $P^i_{I+1}$ with extended Kalman filtering (EKF).

At step 1470, a third propagated pose $P^{WOU}_{I+1}$ is received from the wheel odometry unit.

At step 1480, a final pose $P_m$ is estimated the intermediate pose $P^i_{I+1}$ and the third propagated pose $P^{WOU}_{I+1}$ with extended Kalman filtering (EKF).

At step 1490, the final pose $P_m$ is used to guide the autonomous mobile unit.

Other implementations of the method described in this section can include a non-transitory computer readable storage medium storing instructions executable by a processor to perform any of the methods described above. Yet another implementation of the method described in this section can include a system including one or more memory systems and one or more processors operable to execute instructions, stored in the memory, to perform any of the methods described above.

In some implementations, the IMU may fail to provide inertial data, and the intermediate pose is determined using the first propagated pose from the images. In some implementations, one or more cameras in the multi-ocular system might fail, resulting in an image without a 360-degrees view. A first propagated pose is estimated from remaining operational cameras. In some implementations, all the cameras can fail in the multi-ocular system and data from the IMU is used to determine the intermediate propagated pose. In some implementations, the wheel odometry unit may fail to provide new location data, and the intermediate propagated pose can be used as the final pose.

Generating Pose Information for a
Quadocular-Auxiliary Sensor where an IMU, a
WOU and a GPS Receiver are Used as the
Auxiliary Sensors Propagation: In a quadocular-auxiliary sensor with three auxiliary sensors, a first intermediate propagated pose is estimated using first propagated pose from image information together with second propagated pose from data from the first auxiliary sensor. A second intermediate propagated pose is estimated using first intermediate pose with third propagated pose from data from the second auxiliary sensor. A fourth propagated pose is estimated from the third auxiliary sensor. A final pose is estimated from the second intermediate pose and the fourth propagated pose. Those of ordinary skill in the art will recognize a variety of equivalent variations. In an implementation, an IMU can be the first auxiliary sensor, a wheel odometry unit can be a secondary auxiliary sensor, and a GPS receiver can be the third auxiliary sensor.

Implementations can employ extended Kalman filtering (EKF), to extrapolate the second propagated pose using inertial data from the multi-axis IMU. Propagation by the IMU can be performed in a number of ways: (i) the propagation happens right after an inertial measurement taken by the IMU arrives; or (ii) delayed propagation happens in a batch right after an image taken by the visual sensors arrives but before the update procedure described below is performed. In some implementations, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

The autonomous mobile unit has two wheels which are positioned parallel to each other and equidistant from the center of the mobile unit. The wheels can move forward or backward. The wheels are attached to a rotary encoder, which determines if either wheel has traveled one "unit" forward or reverse along the surface. This unit is the ratio of the circumference of the wheel to the resolution of the encoder. The distance traveled by the mobile unit can be computed from the number of units traveled and the circumference of its wheels. In the case where one wheel is allowed to rotate, while the other remains stationary, the magnitude of the change of position of the center of the robot can be determined using the law of sines. If the left wheel were to move forward one unit while the right wheel remained stationary, then the right wheel acts as a pivot, and the left wheel traces a circular arc in the clockwise direction. If the right wheel were to move forward one unit while the left wheel remained stationary, then the left wheel acts as a pivot, and the right wheel traces a circular arc in the anti-clockwise direction.

Propagation by the WOU can be performed in a number of ways: (i) the propagation happens right after an odometry measurement taken by the WOU arrives; or (ii) delayed propagation happens in a batch right after an image taken by the visual sensors arrives but before the update procedure described below is performed.

The GPS receiver supplies the Control Unit the new geolocation of the autonomous mobile unit. The GPS receiver can provide position, velocity, and covariance information in North-east down (NED) format, or Doppler, pseudo ranges, and covariance information in Earth-centered, Earth-fixed (ECEF) format. Propagation by the GPS receiver can be performed right after a new geolocation arrives from the satellite.

Update: In an implementation, an update process is performed using image information together with IMU, WOU and GPS receiver buffer samples. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

Figure 15:
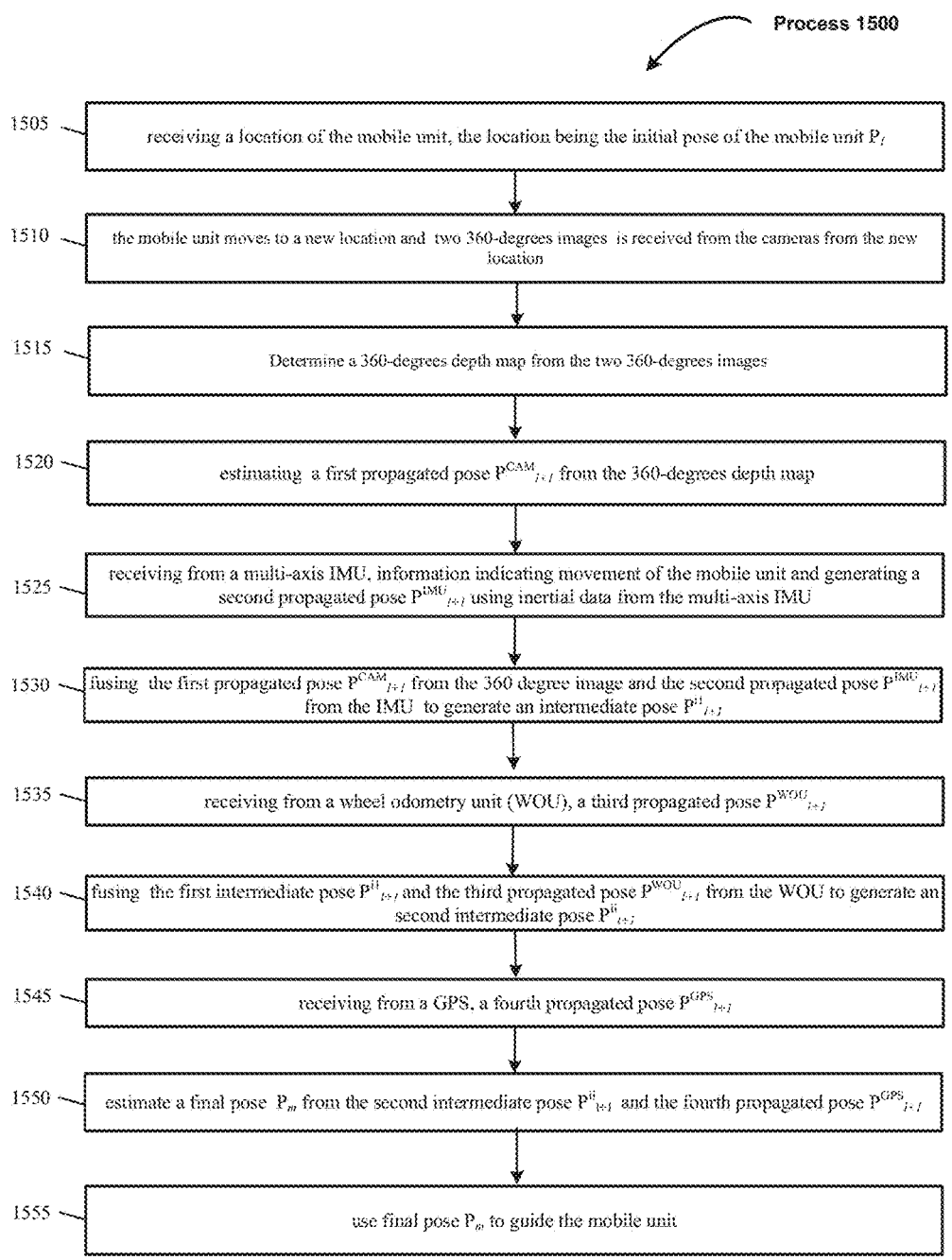
FIG. 15 is a representative method of updating a position of an autonomous mobile unit that includes cameras, a multi-axis inertial measuring unit, a wheel odometry unit and a global positioning system.

FIG. 15 is a representative method 1500 of updating a position of an autonomous mobile unit that includes two or more cameras proving a 360-degrees view, a multi-axis inertial measuring unit, a wheel odometry unit, and a GPS receiver. Flowchart 1500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, autonomous vehicle, etc.

At step 1505, a location of an autonomous mobile unit is received. Let $P_I$ be the initial pose of the autonomous mobile unit.

At step 1510, the autonomous mobile unit moves to a new location, and two new frames with 360-degrees views are captured by the two back-to-back pairs of cameras at the new location.

At step 1515, a 360-degrees depth map is determined from the two 360-degrees views.

At step 1520, a first propagated pose, $P^{CAM}_{I+1}$, is estimated from the 360-degrees depth map.

At step 1525, information is received from the IMU, and a second propagated pose, $P^{IMU}_{I+1}$, is estimated from the inertial data from the IMU.

At step 1530, the first propagated pose $P^{CAM}_{I+1}$ from the 360-degrees image frame and the second propagated pose $P^{IMU}_{I+1}$ from the IMU is fused to generate a first intermediate pose $P^{i}_{I+1}$ with extended Kalman filtering (EKF).

At step 1535, a third propagated pose $P^{WOU}_{I+1}$ is received from the wheel odometry unit.

At step 1540, the first intermediate pose $P^{i}_{I+1}$ and the third propagated pose $P^{WOU}_{I+1}$ from the WOU is fused to generate a second intermediate pose $P^{ii}_{I+1}$ with extended Kalman filtering (EKF).

At step 1545, a fourth propagated pose $P^{GPS}_{I+1}$ is received from the GPS receiver.

At step 1550, a final pose $P_m$ is estimated the second intermediate pose $P^{i}_{I+1}$ and the fourth propagated pose $P^{GPS}_{I+1}$ with extended Kalman filtering (EKF).

At step 1555, the final pose $P_m$ is used to guide the autonomous mobile unit.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In some implementations, the IMU may fail to provide inertial data, and the first intermediate pose is determined using the first propagated pose from the images. In some implementations, one or more cameras in the multi-ocular system might fail, resulting in an image without a 360-degrees view. A first propagated pose is estimated from remaining operational cameras. In some implementations, all the cameras can fail in the multi-ocular system and data from the IMU is used to determine the first intermediate propagated pose. In some implementations, the wheel odometry unit may fail to provide new location data, and the first intermediate propagated pose can be used as the second intermediate pose. In some implementations, the GPS receiver may fail to provide new location data and the second intermediate propagated pose can be used as the final pose.

SIM: Smart Map Interaction and Localize

Smart interaction with map (SIM) processor 1214 enables smart interaction by a device being guided (i.e., receiving positional awareness information from the quadocular-auxiliary sensor system) with a known map in order to localize itself. Accordingly, one implementation of a smart interaction map processor 1214 processing includes: (a) Perform a query of the map based on a need and a current status. Some query components included by specific implementations are map points (xyz, uncertainty, average reprojection error, etc.), keyrigs' poses, 2D-3D constraint information, and occupancy grid (one layer or multiple layer). As used herein, the term keyrig denotes a set of image data received. In some implementations, the sets of image data include feature points and pose information. The pose information includes a location of the mobile device and view of the camera that captured the image data. The sets of image data are referred to collectively as keyrigs; (b) If the map as a whole is not big, e.g., meets a particular threshold size, return the entire map; (c) Otherwise, if the map is big, e.g., meets or exceeds a particular threshold size and covers large areas, e.g., spatial area meets or exceeds a particular threshold, smartly grab a local region of map based on the device's current position; (d) If some area of the map is known to have bad quality, don't use it; and (e) Adaptively down-sample map based on system performance according to an adaptive parameter. For example: (i) if the 3D feature-based tracking process has been accurate, e.g., below a threshold number of errors or invocations of relocalization processing to relocalize a device that has lost its place, then reduce the sample size to conserve resources, otherwise, (ii) if the device is getting lost frequently, e.g., meets or exceeds a threshold, then increase the sample size to provide better tracking.

SDAR: Manage Localization State and Response Strategy

System diagnostics and response (SDAR) processor 1203 performs system level management of current localizing state of a quadocular-auxiliary sensor and provides response strategy. In one implementation, the system diagnostics and response processor 1203 monitors tracked map points and corresponding reprojection error, monitors the longevity of untracked map points, and suggests actions to mapping module, monitors device speed/acceleration/jitter/drift, monitors map "activity" (i.e., is it updated regularly?), performs new added map contribute enough to the overall mapping (i.e., so it's not doing useless hovering?), monitors keyrig topology (i.e., stretch enough or too much?), suggests when and where the device should add keyrig, and monitors feature extractor pipeline Relocalize a Lost Device Re-locator 1222 recovers a device that has lost track of its positional from this state. Once re-locator 1222 returns the lost device back on track, the device can resume normal interacting with smart interaction map processor 1214, and/or can contribute to map building, using the techniques described herein below.

Mapping

In implementations, geometric information obtained by a 3D feature-based tracking process is represented using a descriptive point cloud representation. The descriptive point cloud is a set of sparse 3D points, where each point encodes a 3D geometric location, an uncertainty of the geometric location, and a set of 2D location plus appearance-based descriptors, each observed by a keyrig. A keyrig contains (i) a Timestamp where the images in the keyrig is captured; (ii) a pose (i.e. the transformation from the quadocular-auxiliary sensor's coordinate to the map coordinate at the current time) and its uncertainty; and (iii) a sequence of readings from the auxiliary sensors starting from a first temporal point before the timestamp to a second temporal point after the timestamp. Some implementations further include a flag to specify whether the quadocular-auxiliary sensor is moving or static. This flag can be set from information obtained from the IMU readings.

As a GPS receiver does not work inside a closed environment such as a warehouse, home, etc. Therefore, an implementation of a quadocular-auxiliary sensor is used, where an IMU can be the first auxiliary sensor while a wheel odometry unit can be a secondary auxiliary sensor. In one implementation, data from the visual sensors can be integrated with information from the inertial measurement unit and wheel odometry unit for robustness in difficult lighting or motion situations, and for overall global consistency. Examples of robot applications in a closed environment that benefit from employing positional awareness techniques such as described herein include caregiver and service robots (homes, offices, hospitals, etc.), a robot vacuuming/mopping/cleaning the floor (homes, offices, hospitals, etc.), a robot being commanded to carry objects around the environment (in warehouses, factories, etc.) or a robot butler that follows a person around in homes.

Unlike a closed environment, a GPS receiver can be used as an auxiliary sensor in an open environment such as highways, residential or urban driving environments, etc. Therefore, a quadocular-auxiliary sensor can be used where an IMU can be the first auxiliary sensor while a GPS can be a secondary auxiliary sensor. In one implementation, a quadocular-auxiliary sensor is used where an IMU can be the first auxiliary sensor, a wheel odometry unit can be the second auxiliary sensor, and a GPS can be the third auxiliary sensor. In one implementation, data from the visual sensors can be integrated with information from the inertial measurement unit (IMU) and GPS devices for robustness in difficult lighting or motion situations, and for overall global consistency. Examples of robot applications in an open environment that benefit from employing positional awareness techniques such as described herein include autonomous vehicles, delivery robots and autonomous public transportation Hybrid Representation Implementations represent the spatial information perceived by a 3D feature-based mapping system and optionally an active ranging sensor (placed in parallel to the ground plane) using a hybrid point grid representation. One example implementation of a hybrid point grid representation combines a descriptive point cloud and a multi-layer 2D occupancy grid map.

Figure 16:
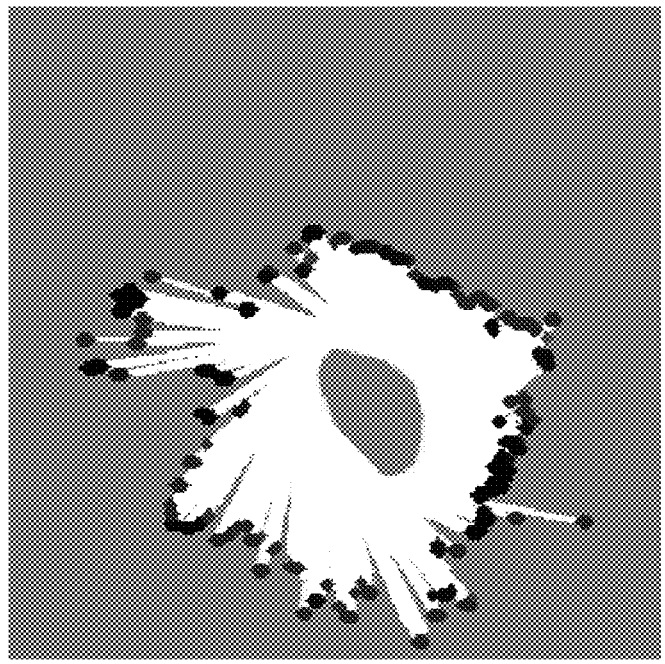
FIG. 16 illustrates an example of an occupancy grid map in one implementation.
Figure 16:
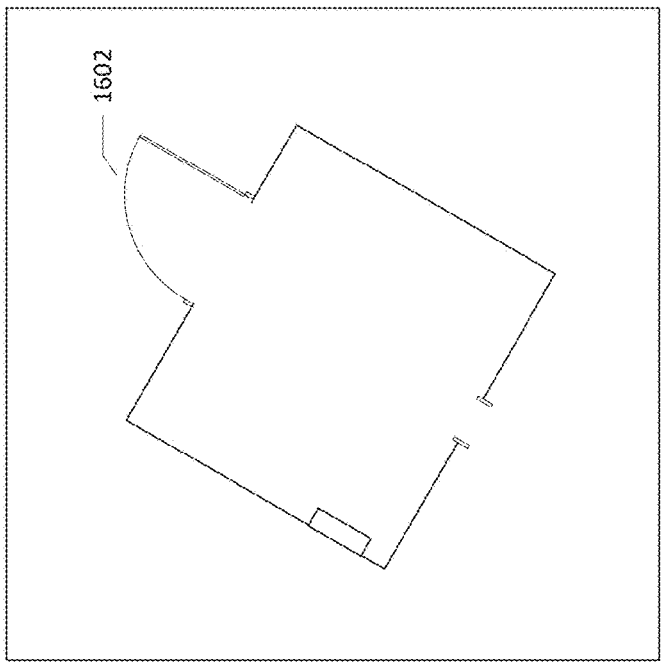

The occupancy grid map can be a plane oriented substantially perpendicular to the direction of gravity. Each layer has a specific height. (The layer on the floor is typically 0 according to one convention.). FIG. 16 illustrates an example of an occupancy grid map in one implementation. Occupancy grid 1600 of FIG. 16 indicates a single layer, such as a floor layer 1602, mapped by an implementation of the quadocular-auxiliary sensor. The white portions of occupancy grid 1600 indicate empty space—in other words space that has been determined by the quadocular-auxiliary sensor to be unoccupied. For example, when the quadocular-auxiliary sensor is able to look through the room door and window to note space beyond the walls of the room that is unoccupied, these regions are marked accordingly in occupancy grid 1600. Portions in solid black indicate space that is occupied by an object or obstacle. The gray portions indicate space that the quadocular-auxiliary sensor has not yet determined whether these spaces are occupied or empty.

A 3 degrees of freedom transform that relates the descriptive point cloud coordinates to the gravity-based coordinates. For example, if the normal vector of the ground plane (i.e., gravity) is known, first rotate the point cloud so that the z-axis of the point cloud is parallel to the gravity, using a 3-by-3 rotation matrix R=R_pitch*R_roll. Then, (optionally) translate the point by [0, 0. T_z] so that the z=0 is on the ground plane. Note, a normal 3-by-3 rotation matrix has 3 degrees of freedom (R_yaw,*R_pitch*R_roll), however in this case are only 2 degrees. A normal 3-by-1 translation has 3 degrees of freedom ([t_x, t_y, t_z]), but here there is only 1 degree.

Creating a Point Cloud for Features Representation

Implementations incrementally create a descriptive point cloud from the results of 3D feature-based tracking by adding keyrigs according to a criterion, such as in a following example. Result of 3D feature based tracking is received in sets of image data that include feature points and pose information. The pose information includes a location of the mobile device and view of the camera that captured the image data. These sets are referred to collectively as keyrigs. Accordingly, an implementation builds a descriptive point cloud by selecting keyrigs using one or more criteria such as for example the following: (a) The first image frame is selected as a keyrig, and the device coordinate frame at that timestamp become the coordinates of the descriptive point cloud. This establishes a frame of reference; (b) The latest keyrig's timestamp is less than current timestamp for a time threshold (typically 2 sec); (c) The distance between the current tracked pose to the latest keyrig's location is larger than a threshold (e.g., x meters); (d) The distance between the current tracked pose to the latest keyrig's pointing angle is larger than a threshold (e.g., y degrees); (e) The current image contains a percentage of features not included in the current descriptive point cloud; and (f) The device is currently static. This information can be obtained from information from the auxiliary sensors.

If the keyrig being considered for addition contains features not included in the current descriptive point cloud, triangulate the new features from images captured from the device at this timestamp to obtain the points in the device's coordinate frame. Add the new points to the map by transforming the points from the device's coordinate frame to the map's coordinate frame. Noteworthy is that some implementations include one or more of (i) triangulating new feature points across images from a current/same keyrig (e.g. between left and right cameras), (ii) triangulating new feature points across images from two different keyrigs, wherein the two different keyrigs are not necessarily in sequence (e.g. left camera from keyrig 1 to left camera from keyrig 10), and (iii) triangulating new feature points from images in keyrigs chosen based upon a criterion (e.g., smart selection of an "optimal" keyrig). The transform is determined using feature-based tracking or other methods.

Refining a Point Cloud

In one implementation, a descriptive point cloud from the 3D feature-based tracking is refined by obtaining an "optimal" (i) pose of each keyrig and (ii) 3D locations of all the points that minimizes weighted sum of re-projection errors of all the points projected to their observed keyrigs, and (iii) optionally, the accelerometer readings from keyrigs with static flag must be [0, 0, 1] to force the z-axis of the map coordinate to be closer to gravity direction, while fulfilling the following constraint (if applicable): the pose moves along a plane (if the device is mounted on a vehicle with planar motion).

In one implementation, refining a descriptive point cloud from the 3D feature-based tracking is performed with limited computation resources by the following processing: (a) Randomly sample N number of keyrigs from the entire set of keyrigs; (b) Accurately refine the pose of the sample set of keyrigs and the 3D points observed in these keyrigs by minimizing the weighted sum of the (i) re-projection errors of all the points projected to their observed keyrigs, and (ii) optionally, the accelerometer readings from keyrigs with static flag must be [0, 0, 1] to force the z-axis of the map coordinate to be closer to gravity direction, while fulfilling the following constraints (if applicable): the pose moves along a plane (if the device is mounted on a vehicle with planar motion); (c) Repeat the sampling and minimizing except fixing the 3D points and the poses that have already been optimized from the previous iteration; and (d) Iterate until a desired percentage of keyrigs and points are optimized.

Creating a Hybrid Point Grid

In one implementation, an initial hybrid point grid representation is created from a descriptive point cloud using the following processing: (a) Transform the descriptive point cloud from its original coordinate frame to a coordinate frame where z-axis is along the gravity direction. This transformation has 2 degrees of freedom (in rotation); (b) Initialize a 2D occupancy grid map for layers that cover the x-y points in the descriptive point cloud; and (c) Each layer of the occupancy grid map is filled in by points (in the descriptive point cloud) within a height range using ray tracing process.

Refining a Hybrid Point Grid

In one implementation, the hybrid point grid representation is refined using information from active sensors using the following processing: (a) Obtain the pose, (transform from the device coordinate to the map's coordinate) where each active sensor's signal is captured, from the trajectory of the device in the map's coordinate frame; and (b) Use ray tracing process to update the 2D occupancy grid map.

In one implementation, the refining hybrid point grid representation from an updated descriptive point cloud is performed using the following processing: (a) Transform the descriptive point cloud's coordinate frame to the gravity-based coordinate frame; and (b) Use ray tracing process to determine which cells to update from each point in the descriptive point cloud.

Estimating a Trajectory for a Guided Device

In one implementation, an offline trajectory of a device between two consecutive keyrigs (i.e. from keyrig k to keyrig k+1) in a descriptive point cloud is estimated using the following processing: (a) Initialize the image frame that creates keyrig k to be at its pose stored in the descriptive point cloud; (b) Use the "3D feature-based tracking process" as described herein under section heading "Tracking" to track the image frames between the two keyrigs. Each image frame has 6-degrees of freedom pose, and a set of correspondences of 3D map point to 2D image observed location; (c) Force the image frame that creates keyrig k+1 to be at its pose stored in the descriptive point cloud; (d) Refine all the poses by minimizing the sum of reprojection errors of all observed locations. The reprojection error is the error between a reprojected point in the camera coordinate frame and the original point. Estimating a Transform for a descriptive point cloud and Gravity Based Frame In one implementation, the 2 degrees of freedom coordinate transform between the descriptive point cloud to a coordinate where z-axis is along the gravity direction is estimated using any of the following methods: (a) Measuring the gravity direction from the auxiliary sensors while it is static, and find a rotation matrix that transforms the gravity direction to [0, 0, 1]; (b) Obtain at least 3 points on the ground-plane from the descriptive point cloud to estimate the ground-plane's normal in the original coordinate. Find a rotation matrix that transforms the ground-plane's normal to [0, 0, 1] or [0, 0, −1]; and (c) Offline calibrate the relation between the quadocular-auxiliary sensors to the ground by placing a known planar pattern on the ground to determine the rotation matrix.

In some implementations, an autonomous mobile unit may require deeper understanding of the environment to behave correctly; for example, at intersections, knowing the location of pedestrians and bicyclists can allow an autonomous vehicle to make more sophisticated precedence decisions. Therefore, the 3-D features can be further classified by the shapes of the features and by their motion. By only considering objects near the road and those that were previously recognized as pedestrians, bicyclists, and cars, autonomous vehicles are frequently able to classify everything in every scan while maintaining real time operation. Assuming the autonomous vehicle drives too fast or too close to the vehicle in front, it has to slow down noticeably but without excessive rush.

Warehouse Robot Implementation

Figure 17:
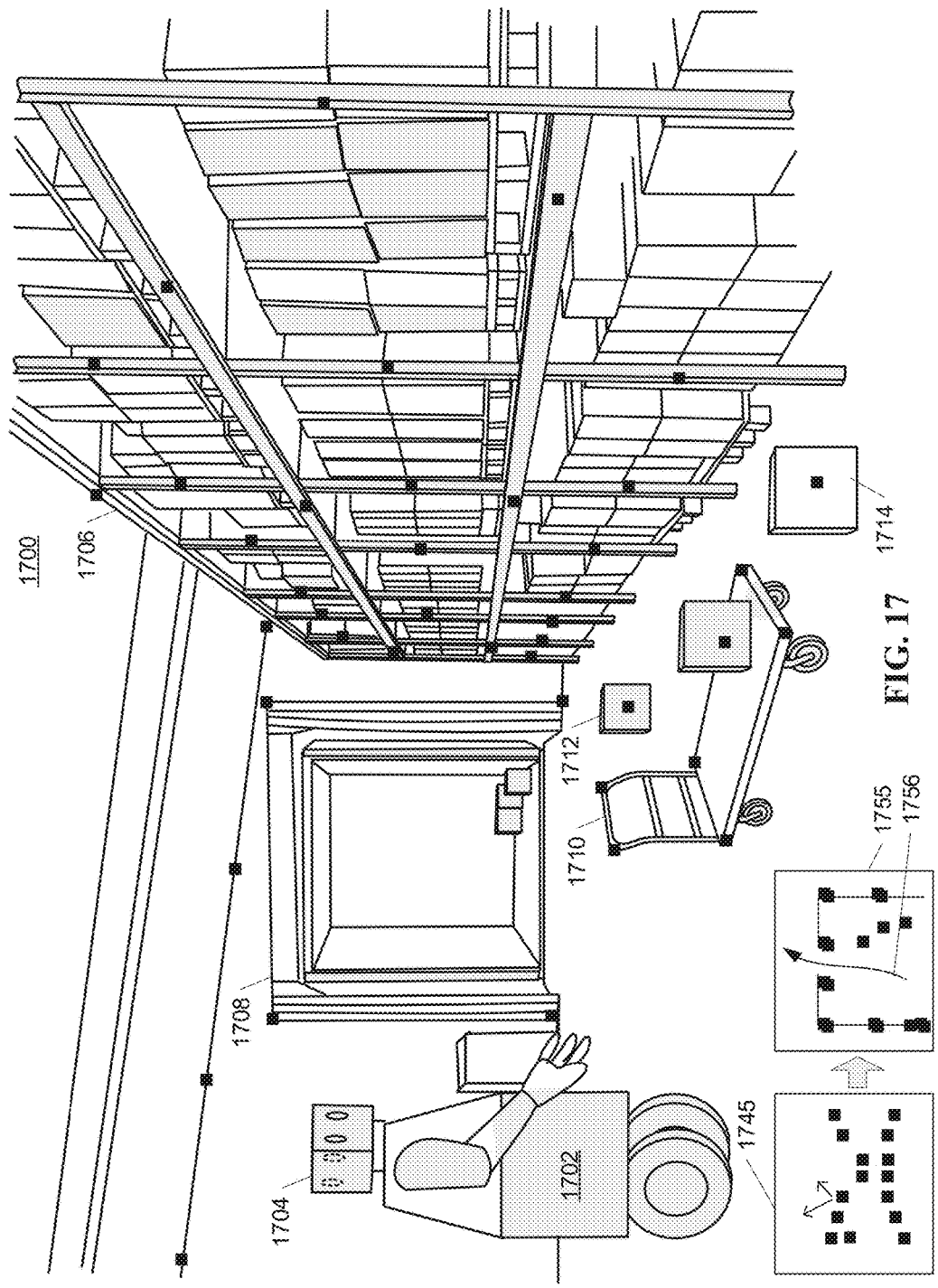
FIG. 17 illustrates an example autonomous robot guidance application in which one implementation can be embodied.

FIG. 17 illustrates an example model of a warehouse robot 1702 guidance using image and auxiliary sensor information techniques described herein. As a GPS receiver does not work inside closed environment such as a warehouse, a quadocular-auxiliary sensor 1704 is used where an IMU can be the first auxiliary sensor while a wheel odometry unit can be a secondary auxiliary sensor.

Examples of other robot applications that benefit from employing positional awareness techniques such as described herein include caregiver and service robots (traveling on a ground plane), a robot vacuuming/mopping/cleaning the floor, a robot being commanded to carry objects around the environment, a telepresence robot moving around a remote environment automatically, a robot butler that follows a person around, etc.

In each of the scenarios listed above, the warehouse robot utilizes the technology disclosed herein in order to track its own location and to recognize the objects that it encounters. Also, since the warehouse robot performs many complex tasks, each with real-time constraints, it is beneficial that the sensing be done rapidly to accelerate the perception pipeline. In implementations, this can be achieved by offloading some computation from the main processor to the quadocular-auxiliary sensor. In addition, since it is a mobile robot, which carries limited storage capacity battery, energy consumption is a design point. In implementations, some computational tasks are off loaded from the main processor to the quadocular-auxiliary sensor to reduce power consumption, thereby enabling implementations to achieve overall energy efficiency. Cost is an issue in mobile robots, since lowering the cost of the robot makes the robot affordable to more customers. Hence cost can be another factor for sensor and guidance system design.

In FIG. 17, the walls, corners and loading dock 1708 of warehouse room 1700 as well as the travels of warehouse robot 1702 on the floor of room 1700 are reflected in the hybrid point grid, comprised of descriptive point cloud 1745 and occupancy grid 1755, developed by the quadocular-auxiliary sensor using the technology described herein above in the Mapping section. The occupancy grid 1755 is a part of the hybrid point grid that is a layer of the multi-layer 2D occupancy grid map described in the Mapping section. To build a map of an unknown (newly exposed) environment, the quadocular-auxiliary sensor equipped robot 1702 keeps track of its pose using the technology described herein above in the Tracking section while incrementally building an initial descriptive point cloud using the technology described herein above in the Mapping section. Then, the robot 1702 builds an occupancy grid 1755 to complete the hybrid point grid from the initial descriptive point cloud 1745 using the technology described herein above in the Mapping section.

Obtain Real Time Image and Information from Auxiliary Sensors

In order to track its location, the robot senses its own movement through quadocular-auxiliary sensor. The quadocular-auxiliary sensor generates reliable data from auxiliary sensors so that the tracking and mapping pipeline that follows can accurately infer the robot's location. FIG. 17 illustrates an example warehouse robot guidance application in which one implementation can be embodied. As illustrated by FIG. 17, robot 1702 implements quadocular-auxiliary sensor to self-localize within a room 1700. The robot 1702 in FIG. 17 has two cameras in the front (solid circles) and two cameras at the back (dotted circles) of a quadocular-auxiliary sensor 1704 in order to capture image frames of the surrounding environment of room 1700. The images are processed according to the technology disclosed herein above under the Sensor Visual Data Generation and Processing section as follows:

Detect and Describe Features in Captured Images

Quadocular-auxiliary sensor determines feature points for the walls, loading dock 1708, shelves 1706, trolley 1710, and random boxes 1712, 1714 scattered around the room 1700 from the information in the captured image frames. In some implementations, Shi-Tomasi feature detection is employed to determine the feature points 1706, 1708, 1710, 1712, 1714 from the image frames. Features are assigned descriptors using ORB feature description. Optical flow techniques are used to determine 2D correspondences in the images, enabling matching together features in different images.

Map Feature descriptors to a Hybrid Point Grid

The quadocular-auxiliary sensor equipped warehouse robot 1702 can build a descriptive point cloud 1745 of the obstacles in room 1700 enabling the robot 1702 to circumnavigate obstacles and self-localize within room 1700. Quadocular-auxiliary sensor creates, updates, and refines descriptive point cloud 1745 using feature descriptors determined for room features indicated by points 1706, 1708, 1710, 1712, and 1714 using the technology disclosed herein above under the Mapping sections. As depicted schematically in FIG. 17, descriptive point cloud 1745 includes coordinates and feature descriptors corresponding to the feature points 1706, 1708, 1710, 1712, 1714 of room 1700. Quadocular-auxiliary sensor prepares an occupancy map 1755 by reprojecting feature points 1706, 1708, 1710, 1712, 1714 onto a 2D layer corresponding to the floor of the room 1700. In some implementations, second and possibly greater occupancy maps are created at differing heights of the warehouse robot 1702, enabling the robot 1702 to navigate about the room 1700 without bumping its head into door soffits, or other obstacles above the floor.

Now with renewed reference to FIG. 16, which illustrates an example of an occupancy grid 1600, the white portions indicate empty space—in other words space that has been determined by quadocular-auxiliary sensor to be unoccupied. Portions in solid black indicate space that is occupied by an object or obstacle. The gray portions indicate space that the quadocular-auxiliary sensor of warehouse robot 1702 has not yet determined whether these spaces are occupied or empty.

The descriptive point cloud 1745 and occupancy grid 1755 comprise a hybrid point grid that enables the warehouse robot 1702 to plan paths of travel through room 1700, using the occupancy grid 1755 and self-localize relative to features in the room 1700 using the descriptive point cloud 1745.

Using the Occupancy Grid and Path Planning

When the robot is activated in a previously mapped environment, the robot uses the technology described herein above in the Tracking sections to self-locate within the descriptive point cloud 1745. The descriptive point cloud 1745 and occupancy grid 1755 comprise a hybrid point grid representation that is key to enabling robot action (i.e. moving on the floor) using passive sensors because the robot uses the occupancy grid 1755 in order to plan a trajectory 1756 from its current location to the loading dock in the map using the technology described herein above in the Mapping sections. A person or entity can also command the robot to go to a specific point in the occupancy grid 1755. While traveling, the robot uses the descriptive point cloud 1745 to localize itself within the map as described herein above in the Tracking sections. The robot can update the map using the techniques described herein above in the Mapping sections. Further, some implementations equipped with active sensors (e.g. sonar, LIDAR) can update the map using information from these sensors as well.

Autonomous Vehicle Implementation

Figure 18:
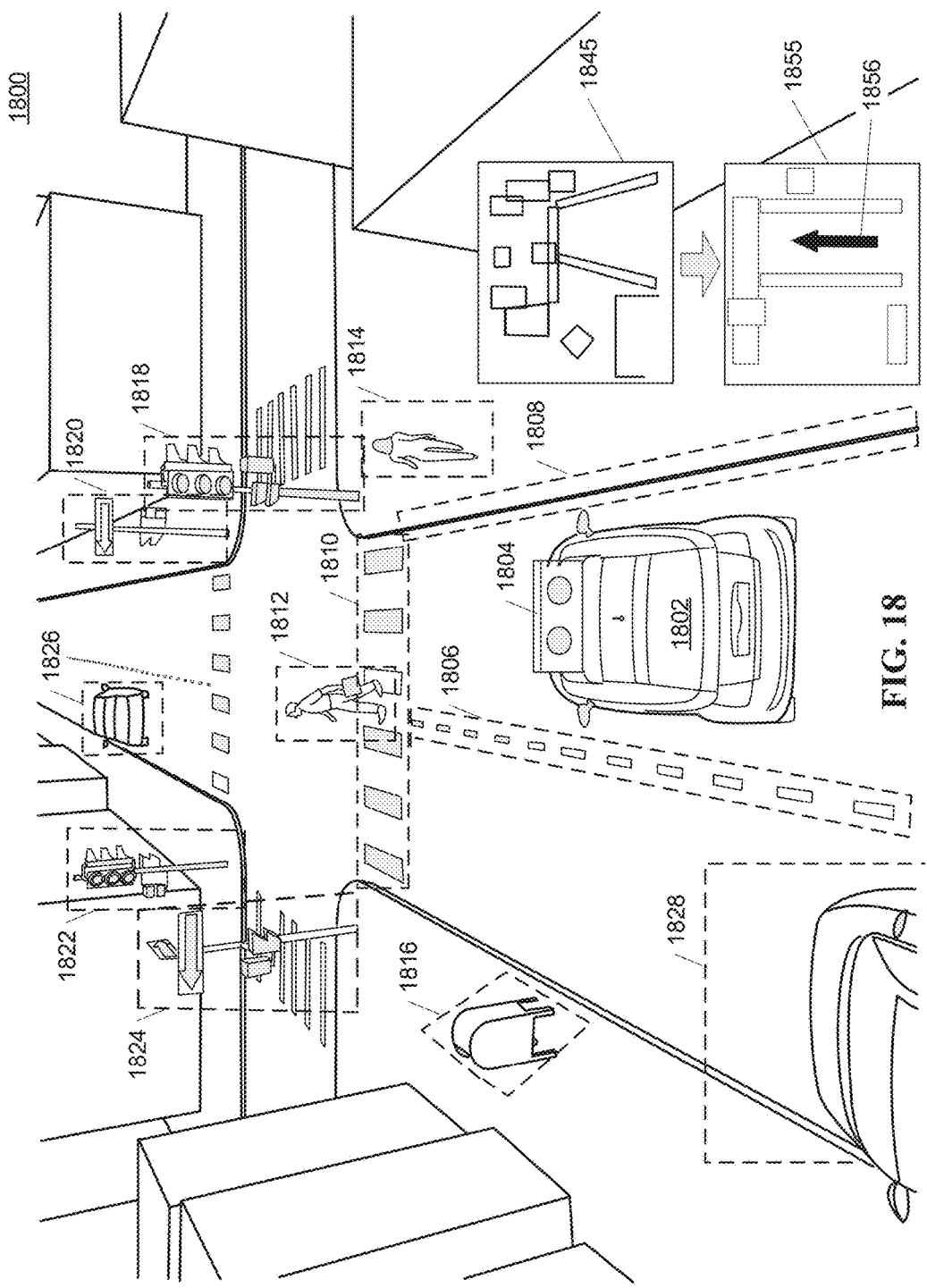
FIG. 18 illustrates an example autonomous vehicle guidance application in which one implementation can be embodied.

FIG. 18 illustrates an example model of an autonomous vehicle 1802 guidance using image and auxiliary sensor information techniques described herein. A quadocular-auxiliary sensor 1804 is used where an IMU can be the first auxiliary sensor while a GPS receiver can be a secondary auxiliary sensor. In another implementation, a quadocular-auxiliary sensor is used where an IMU can be the first auxiliary sensor, a wheel odometry unit can be the second auxiliary sensor, and a GPS can be the third auxiliary sensor.

Examples of other robot applications that benefit from employing positional awareness techniques such as described herein include delivery robots and autonomous public transportations.

In each of the scenarios listed above, the autonomous vehicle utilizes the technology disclosed herein in order to track its own location and to recognize the objects that it encounters. Also, since the autonomous vehicle performs many complex tasks, each with real-time constraints, it is beneficial that the sensing be done rapidly to accelerate the perception pipeline. In implementations, this can be achieved by offloading some computation from the main processor to the quadocular-auxiliary sensor. In addition, since autonomous vehicle carries limited storage capacity battery, energy consumption is a design point. In implementations, some computational tasks are off loaded from the main processor to the quadocular-auxiliary sensor to reduce power consumption, thereby enabling implementations to achieve overall energy efficiency.

In FIG. 18, objects in an urban driving environment 1800 as well as the travels of the autonomous vehicle 1802 on the road of the urban driving environment 1800 are reflected in the hybrid point grid, comprised of descriptive point cloud 1845 and occupancy grid 1855, developed by the quadocular-auxiliary sensor using the technology described herein above in the Mapping section. The occupancy grid 1855 is a part of the hybrid point grid that is a layer of the multi-layer 2D occupancy grid map described in the Mapping section. To build a map of an unknown (newly exposed) environment, the quadocular-auxiliary sensor equipped autonomous vehicle 1802 keeps track of its pose using the technology described herein above in the Tracking section while incrementally building an initial descriptive point cloud using the technology described herein above in the Mapping section. Then, the autonomous 1802 builds an occupancy grid 1855 to complete the hybrid point grid from the initial descriptive point cloud 1845 using the technology described herein above in the Mapping section.

Obtain Real Time Image and Information from Auxiliary Sensors

In order to track its location, the autonomous vehicle senses its own movement through quadocular-auxiliary sensor. The quadocular-auxiliary sensor generates reliable data from auxiliary sensors so that the tracking and mapping pipeline that follows can accurately infer the autonomous vehicle's location. FIG. 18 illustrates an example autonomous vehicle guidance application in which one implementation can be embodied. As illustrated by FIG. 18, autonomous vehicle 1802 implements quadocular-auxiliary 1804 sensor to self-localize within an urban driving environment room 1800. The autonomous vehicle 1802 in FIG. 12 has two cameras in the front (not shown in FIG. 12) and at the back (shown in FIG. 12) of a quadocular-auxiliary sensor 1804 in order to capture image frames of the surrounding urban driving environment 1800. The images are processed according to the technology disclosed herein above under the Sensor Visual Data Generation and Processing section as follows:

Detect and Describe Features in Captured Images

Quadocular-auxiliary sensor determines feature points lane dividers 1806, roadside curbs 1808, zebra crossing 1810, a pedestrian crossing the road 1812, a pedestrian walking on the sidewalk 1814, a mailbox 1816, traffic signal posts 1818, 1820, 1822, 1824, a car in front of the autonomous vehicle 1826, and a car behind the autonomous vehicle 1828 from the information in the captured image frames. In some implementations, a convolution neural network is employed to determine the feature points 1806, 1808, 1810, 1812, 1814, 1816, 1818, 1820, 1822, 1824, 1826, and 1828 from the image frames and obtain feature description. Optical flow techniques are used to determine 2D correspondences in the images, enabling matching together features in different images.

Map Feature descriptors to a Hybrid Point Grid

The quadocular-auxiliary sensor equipped autonomous vehicle 1802 can build a descriptive point cloud 1845 of the obstacles in the urban driving environment 1800 enabling the autonomous vehicle 1802 to circumnavigate obstacles and self-localize within the driving environment 1800. Quadocular-auxiliary sensor creates, updates, and refines descriptive point cloud 1845 using feature descriptors determined for room features indicated by points 1806, 1808, 1810, 1812, 1814, 1816, 1818, 1820, 1822, 1824, 1826, and 1828 using the technology disclosed herein above under the Mapping sections. As depicted schematically in FIG. 18, descriptive point cloud 1845 includes coordinates and feature descriptors corresponding to the feature points 1806, 1808, 1810, 1812, 1814, 1816, 1818, 1820, 1822, 1824, 1826, and 1828 of urban driving environment 1800. Quadocular-auxiliary sensor prepares an occupancy map 1855 by reprojecting feature points 1806, 1808, 1810, 1812, 1814, 1816, 1818, 1820, 1822, 1824, 1826, and 1828 onto a 2D layer corresponding to the floor of the urban driving environment 1800. In some implementations, second and possibly greater occupancy maps are created at differing heights of the autonomous vehicle 1802, enabling the autonomous vehicle 1802 to navigate about the urban driving environment 1800 without bumping without hitting a pedestrian, or following traffic signals.

The descriptive point cloud 1845 and occupancy grid 1855 comprise a hybrid point grid that enables the autonomous vehicle 1802 to plan paths of travel through the driving environment 1800, using the occupancy grid 1855 and self-localize relative to features in the driving environment 1800 using the descriptive point cloud 1845.

Using the Occupancy Grid and Path Planning

When the autonomous vehicle is activated in a previously mapped environment, the autonomous vehicle uses the technology described herein above in the Tracking sections to self-locate within the descriptive point cloud 1845. The descriptive point cloud 1845 and occupancy grid 1855 comprise a hybrid point grid representation that is key to enabling autonomous vehicle action (i.e. moving forward along the road) using passive sensors because the autonomous vehicle uses the occupancy grid 1855 in order to plan a trajectory 1856 from its current location to its final destination in the map using the technology described herein above in the Mapping sections. A person or entity can also command the autonomous vehicle to go to a specific point in the occupancy grid 1855. While traveling, the autonomous vehicle uses the descriptive point cloud 1845 to localize itself within the map as described herein above in the Tracking sections. The robot can update the map using the techniques described herein above in the Mapping sections. Further, some implementations equipped with active sensors (e.g. sonar, LIDAR) can update the map using information from these sensors as well.

Processes

Figure 19:
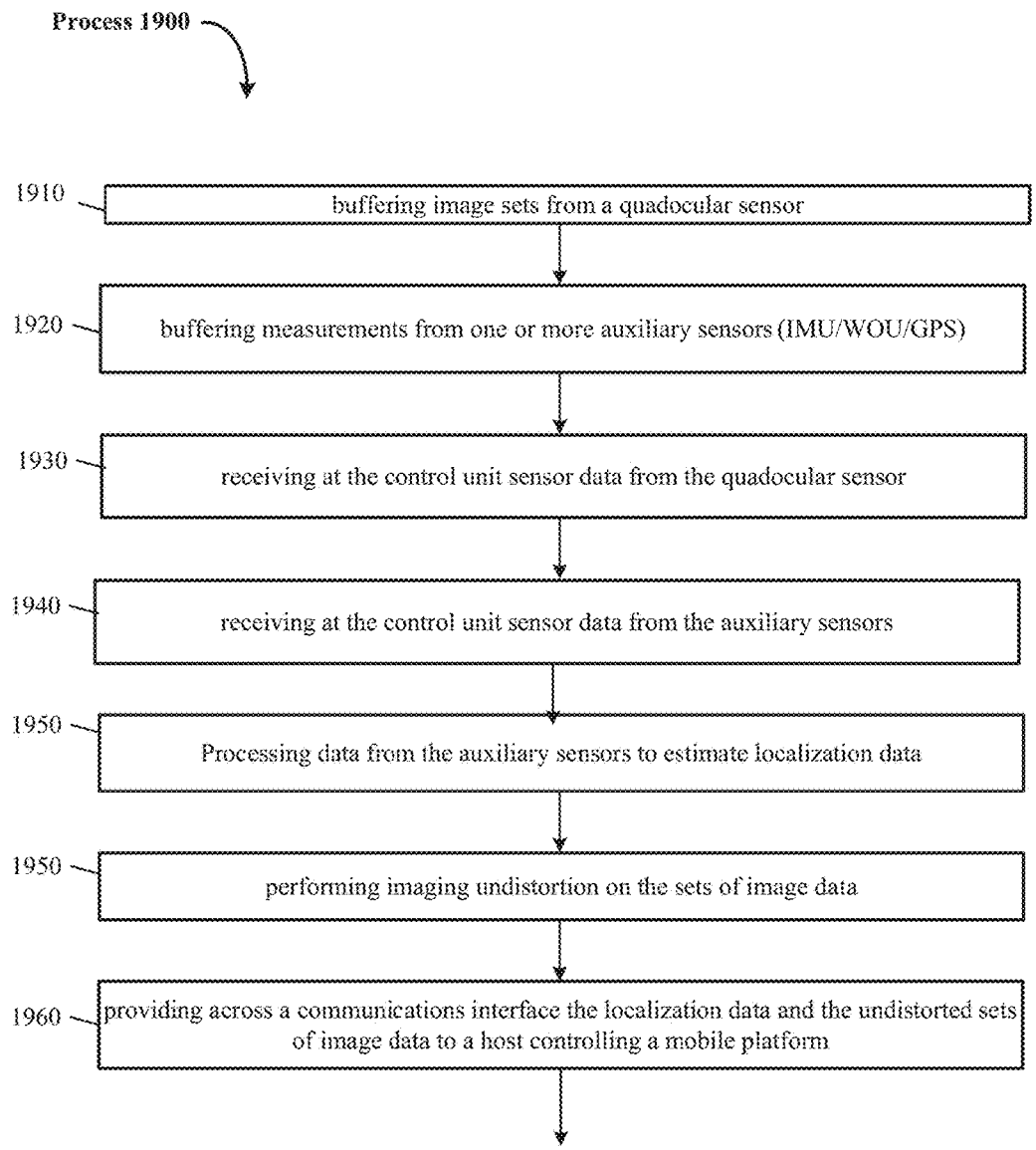
FIG. 19 is a representative method of guiding an autonomous mobile unit using information from multiple cameras and auxiliary sensors.

FIG. 19 is a representative method 1900 of guiding an autonomous mobile unit using information from a camera with distance calculation and from the auxiliary sensors. Flowchart 1900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 19. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 19 includes process 1900 that begins at action 1910, where image sets from a visual sensor are buffered. In some implementations, image sets are received from a visual sensor. The visual sensor is disposed on a mobile platform, such as a robot, autonomous vehicle, or other autonomous or guided mobile platform.

Process 1900 continues at action 1920 where measurements from auxiliary sensors are buffered. The auxiliary sensors can be collocated with the visual sensor or can be disposed at an offset thereto.

At action 1930, the sets of image data are received at a Control Unit.

At action 1940, the sets of sensor data from the auxiliary sensors are received at the Control Unit.

At action 1950, the sets of sensor data from the auxiliary sensors are processed to estimate localization data. Inertial data from the multi-axis IMU are timestamped, corrected for bias, scaled using a stored scale factor the corrected inertial data, and then corrected for misalignment in the IMU to form localization data. Odometry data from the WOU are timestamped, adjusted for slippage, and then scaled using a stored scale factor the corrected odometry to form localization data. Geolocation data from the GPS receiver are timestamped to form localization data.

At action 1950, imaging undistortion is performed on the sets of image data.

At action 1960, the localization data and the undistorted sets of image data are provided across a communications interface to a host controlling a mobile platform.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 20:
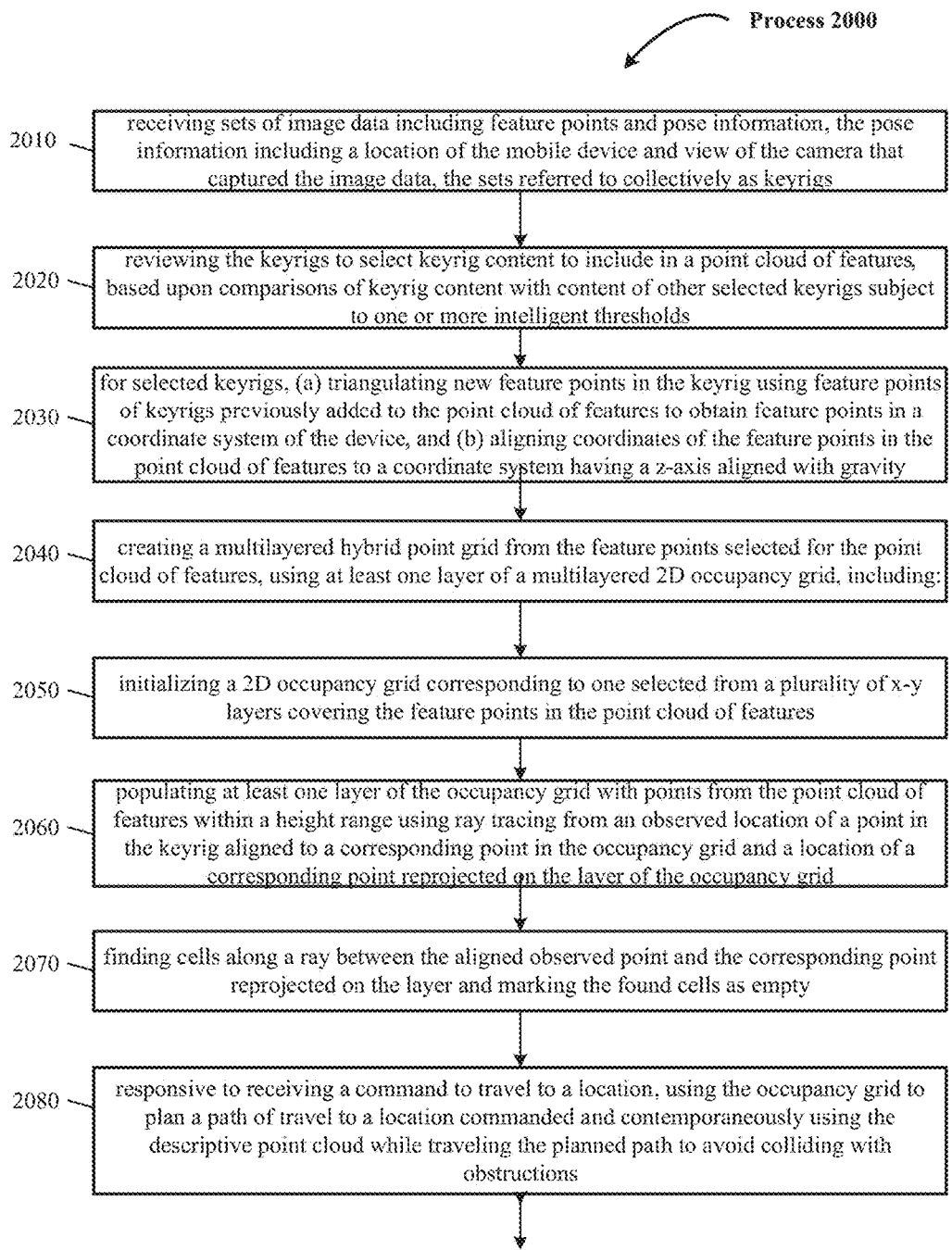
FIG. 20 is a representative method of navigating an autonomous mobile unit that multiple cameras and auxiliary sensors.

FIG. 20 is a representative method 2000 of using a hybrid point grid to guide an autonomous mobile unit that includes more than one camera with distance calculation and one or more auxiliary sensors. Flowchart 2000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 20. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 20 includes process 2000 that begins at action 2010, where sets of image data are received. In some implementations, the sets of image data include feature points and pose information. The pose information includes a location of the autonomous mobile unit and view of the camera that captured the image data. The sets of image data are referred to collectively as keyrigs.

Process 2000 continues at action 2020 where the keyrigs are reviewed to select keyrig content to include in a point cloud of features, based upon comparisons of keyrig content with content of other selected keyrigs subject to one or more intelligent thresholds. As used herein, intelligent thresholds includes a threshold that is adaptively adjusted based upon device movement, sensor readings, situational or environmental variables (e.g., low light, fog, bright light, and so forth) or combinations thereof.

At action 2030, for selected keyrigs, (a) new feature points in the keyrig are triangulated using feature points of keyrigs previously added to the point cloud of features to obtain feature points in a coordinate system of the device, and (b) coordinates of the feature points in the point cloud of features are aligned to a coordinate system having a z-axis aligned with gravity.

At action 2040, a multilayered hybrid point grid is created from the feature points selected for the point cloud of features, using at least one layer of a multilayered 2D occupancy grid by the following:

At action 2050, a 2D occupancy grid corresponding to one selected from a plurality of x-y layers covering the feature points in the point cloud of features is initialized.

At action 2060, at least one layer of the occupancy grid is populated with points from the point cloud of features within a height range using ray tracing from an observed location of a point in the keyrig aligned to a corresponding point in the occupancy grid and a location of a corresponding point reprojected on the layer of the occupancy grid.

At action 2070, cells along a ray between the aligned observed point and the corresponding point reprojected on the layer are found and the found cells are marked as empty.

At action 2080, responsive to receiving a command to travel to a location, the occupancy grid is used to plan a path of travel to a location commanded and contemporaneously the descriptive point cloud is used while traveling the planned path to avoid colliding with obstructions.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

CONCLUSION AND ADDITIONAL IMPLEMENTATIONS

We describe a system and various implementations for guiding a mobile device using information from one or more camera and one or more auxiliary sensors, e.g. multi-axis inertial measuring unit (IMU), wheel odometry unit (WOU), depth sensor, etc.

Some particular implementations and features are described in the following discussion.

In one implementation, described is an apparatus that guides an autonomous mobile unit using information from one or more cameras with one or more auxiliary sensors. The apparatus can include a multi-ocular controller which comprise at least four interfaces to couple with at least four cameras, each camera providing a field of view of 170 degrees to 210 degrees and the cameras are configured into back-to-back pairs, where each pair of cameras provides at least a 360-degrees view. The multi-ocular controller further includes a synchronization signal generator that creates a synchronization signal to provide to each of the cameras enabling the cameras to acquire images in time frames relative to one another, a timestamp generator that creates time stamps for images captured by the cameras, thereby maintaining a set of synchronized images in which images captured are tagged with a current timestamp. The apparatus further includes a Digital Signal Processor (DSP) that receives image information in frames of at least 3 Megabytes (3 MB) from a camera at a rate of at least 30 frames per second (FPS) via an Input/output (I/O) interface and extract features from the image information; a feature buffer that includes at least a first bank and a second bank to contain features extracted from the image information; a buffer controller that triggers a notification to consumer processes that features are available in at least one of the first bank and the second bank of the feature buffer; the capability of locking the first bank from further receiving features from the DSP while features from the first bank are being consumed by the consumer processes, once the first bank is filled; and one or more processing cores that executes the consumer processes, including a mapping process that builds a map as a guided vehicle explores and an update process that compares features to the map, and that provides output of one or more of the mapping process and the update process to a guided vehicle.

In some implementations, the multi-ocular controller can be implemented on a field programmable gate array (FPGA).

In some implementations, the field of view is between 180 degrees to 200 degrees.

In some implementations, the field of view is 190 degrees.

In some implementations, the images from the cameras are not aggregated and processed individually.

In some implementations, the images from the cameras are aggregated which enables multiple images to be processed as an aggregated image.

In some implementations, the images from the cameras are rectified.

In some implementations, a first pair of cameras is disposed approximately horizontally with respect to a second pair of cameras.

In some implementations, a first pair of cameras is disposed approximately vertically with respect to a second pair of cameras.

In some implementations, the apparatus further includes an interface to couple with an inertial measurement unit (IMU).

In some implementations, the apparatus further includes a global real-time clock, and the timestamp generator synchronizes with the global real-time clock when creating time stamps.

In some implementations, the apparatus synchronizes IMU data with the global real-time clock.

In some implementations, the apparatus further includes an interface to couple with an odometry sensor.

Also disclosed is an implementation that includes a method of guiding an autonomous mobile unit that includes a visual sensor having at least four operational camera providing a 360-degrees view about a centerline of the mobile platform and an IMU and a GPS receiver as auxiliary sensors. The method includes receiving images from at least 4 cameras; fusing a first propagated pose from the images with a second propagated pose from an IMU to provide an intermediate propagated pose to an EKF propagator; receiving at the EKF propagator a third propagated pose from a GPS receiver; preparing an updated propagated pose from the intermediate and third propagated poses; and providing the updated propagated pose to guide a mobile platform. In some implementations, the method is implemented in a system which includes a processor and a computer readable storage unit storing instructions. In some implementations, the method is implemented in a system which includes a non-transitory computer readable medium to store instructions.

In some implementations, the method further includes the capability of detecting a failure condition of the IMU; being responsive to the failure condition of the IMU detected; and determining the intermediate pose using the first propagated pose from the images.

In some implementations, the method further includes the capability of detecting a failure condition of at least one of the at least 4 cameras. When a single camera fails resulting in no 360-degrees view, image information from the remaining cameras are used to determine the first propagated pose. When all cameras fail resulting in no image information, data from the IMU is used to determine the intermediate propagated pose.

In some implementations, the method further includes the capability of detecting a failure condition of the GPS receiver; being responsive to the failure condition; and providing the intermediate propagated pose as the updated propagated pose.

In some implementations, the GPS receiver provides position, velocity and covariance information of the autonomous mobile unit in North-east down (NED) format and has the capability of converting the intermediate propagated pose into NED format and the propagated poses are reported in North-east down (NED) format.

In some implementations, the GPS receiver provides doppler, pseudo ranges and covariance information in Earth-centered, Earth-fixed (ECEF) format and has the capability of converting the intermediate propagated pose into ECEF format and reported the propagated poses in Earth-centered, Earth-fixed (ECEF) format.

In some implementations, the GPS receiver provides NED position and covariance information in North-east down (NED) format and has the capability of converting the intermediate propagated pose into NED format and reporting the propagated poses in North-east down (NED) format.

In some implementations, the IMU propagates a position every 5 ms, and the IMU error is accumulated over time. In every 100 ms, updated information is received from the GPS receiver which is used to correct the IMU error.

Also disclosed is an implementation that includes a method of guiding an autonomous mobile unit that includes a visual sensor having at least four operational camera providing a 360-degrees view about a centerline of the mobile platform and an IMU and a WOU as auxiliary sensors. The method includes receiving images receiving images from at least 4 cameras providing a 360-degrees view about a centerline of the mobile platform; fusing a first propagated pose from the images with a second propagated pose from an IMU to provide an intermediate propagated pose to an EKF propagator; receiving at the EKF propagator a third propagated pose from an odometry sensor coupled with at least one wheel of the autonomous mobile platform; preparing an updated propagated pose from the intermediate and third propagated poses; and providing the updated propagated pose to guide a mobile platform. In some implementations, the method is implemented in a system which includes a processor and a computer readable storage unit storing instructions. In some implementations, the method is implemented in a system which includes a non-transitory computer readable medium to store instructions.

In some implementations, the method further includes the capability of detecting a failure condition of the IMU; being responsive to the failure condition of the IMU detected; and determining the intermediate pose using the first propagated pose from the images.

In some implementations, the method further includes the capability of detecting a failure condition of at least one of the at least 4 cameras. When a single camera fails resulting in no 360-degrees view, image information from the remaining cameras are used to determine the first propagated pose. When all cameras fail resulting in no image information, data from the IMU is used to determine the intermediate propagated pose.

In some implementations, the method further includes the capability of detecting a failure condition of the odometry sensor; being responsive to the failure condition; and providing the intermediate propagated pose as the updated propagated pose.

Also disclosed is an implementation that includes a method of guiding an autonomous mobile unit that includes a visual sensor having at least four operational camera providing a 360-degrees view about a centerline of the mobile platform and an IMU and a GPS receiver as auxiliary sensors. The method includes receiving images from at least 4 cameras providing a 360-degrees view about a centerline of the mobile platform; fusing a first propagated pose from the images with a second propagated pose from an IMU to provide a first intermediate propagated pose to an EKF propagator; fusing the first intermediate propagated pose from the images and the IMU with a third propagated pose from an odometry sensor coupled to at least one wheel, to provide a second intermediate propagated pose to an EKF propagator; receiving at the EKF propagator a fourth propagated pose from a GPS receiver; preparing an updated propagated pose from the second intermediate and fourth propagated poses; and providing the updated propagated pose to guide a mobile platform. In some implementations, the method is implemented in a system which includes a processor and a computer readable storage unit storing instructions. In some implementations, the method is implemented in a system which includes a non-transitory computer readable medium to store instructions.

In some implementations, the method further includes the capability of detecting a failure condition of the IMU; being responsive to the failure condition of the IMU detected; and determining the first intermediate pose using the first propagated pose from the images.

In some implementations, the method further includes the capability of detecting a failure condition of at least one of the at least 4 cameras. When a single camera fails resulting in no 360-degrees view, image information from the remaining cameras are used to determine the first propagated pose. When all cameras fail resulting in no image information, data from the IMU is used to determine the first intermediate propagated pose.

In some implementations, the method further includes the capability of detecting a failure condition of the odometry sensor; being responsive to the failure condition; and providing the first intermediate propagated pose as the second intermediate propagated pose.

In some implementations, the method further includes the capability of detecting a failure condition of the GPS receiver; being responsive to the failure condition; and providing the second intermediate propagated pose as the updated propagated pose.

In some implementations where an IMU is used as an auxiliary sensor, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

In some implementations where an IMU is used as an auxiliary sensor, the image update from the camera in the mobile unit with one operational camera can fail due to a blurred image captured due to fast motion of the mobile unit, poor illumination in the surrounding environment, camera's viewpoint is being blocked by an object, etc. Also, there can be a significant number of IMU propagations between two successful image update. After a certain number of consecutive image update failures, propagation is performed by using the EKF method on the gyroscope reading of the IMU. Propagation based on the on the gyroscope reading of the IMU predicts a propagated pose by assuming the mobile unit is rotating in place.

In some implementations, the tracking can be entirely mapless by keeping a window of image frames during the tracking process. A 2D-2D feature matching correspondence is maintained by two consecutive image frames in the window of image frames. At any time, a small local map can be reconstructed by triangulating the 2D features.

In some implementations, 2D features matching from two consecutive image frames can be performed by combining corner feature detection and optical flow. Given the set of 2D features detected in the first image at time t−1, the location of each 2D feature in the second image at time t is estimated by using optical flow. If the number of 2D features detected through optical flow in the second image is less than the number of 2D features in the second image. The 2D corner features can be detected by using Eigen values of neighboring pixels or by binning the second image spatially. 2D features can be matched temporally between a first image taken at time t−1 and a second image taken at time t from the same camera by matching the 2D features by optical flow or establishing links between 2D features from consecutive time frames with similar description and location proximity (i.e., within 20 pixels).

In some implementations, if there is more than one operational camera, 2D features can be matched spatially through links. A link is set of 2D features from different cameras with different spatial viewpoints. 2D features can be matched spatially for each camera to existing links by collecting the set of 2D features that are not matched to any existing links (i.e. features that are left out from temporal matching), collecting the set of links that are available to be connected to features from this camera, and calculating the similarity between each available feature and each available link. The similarity between a feature and a link is the best similarity score between the descriptor of this feature and the descriptors of the features in the link. If the similarity score is more than a threshold, match the 2D feature to the link. If the similarity score is less than a threshold, check the similarity score of the 2D feature with another available link. New links can be created by collecting the set of features that are not matched to any existing links (i.e. features that are left out from both temporal matching and spatial matching to existing links), collecting the set of links that are available to be connected to features from the current camera (a link is available when it does not contain a feature from this camera at the current time), and calculating the similarity between each feature and each available link. If the similarity score is more than a threshold, add the available 2D feature to the available link. New links can be created across one or more camera by collecting a set of features that are not matched to any existing links, and calculating the similarity between a pair of 2D features from different.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method for guiding an autonomous mobile platform, including:
    receiving images from at least 4 cameras providing at least two frames, each frame providing a 360-degrees view about a centerline of the mobile platform;
    determining, by a processor, a 360-degrees depth map from the frames;
    estimating, by a processor, a propagated pose from the 360-degrees depth map;
    fusing a first propagated pose from the depth map with a second propagated pose from an IMU to provide an intermediate propagated pose to an Extended Kalman Filter (EKF) propagator;
    receiving at the EKF propagator a third propagated pose from a GPS receiver;
    preparing, by a processor, an updated propagated pose from the intermediate and third propagated poses; and
    providing the updated propagated pose to guide a mobile platform.

2. The method of claim 1, further comprising:
    detecting a failure condition of the IMU; and
    responsive to the failure condition of the IMU detected, determining the intermediate pose using the first propagated pose from the images.

3. The method of claim 1, further comprising:
    detecting a failure condition of at least one of the at least 4 cameras;
    when a single camera fails resulting in no 360-degrees view, responsively using image information from remaining cameras to determine the first propagated pose; and
    when all cameras fail resulting in no image information, responsively using data from the IMU to determine the intermediate propagated pose.

4. The method of claim 1, further comprising:
detecting a failure condition of the GPS receiver; and
responsive to the failure condition, providing the intermediate propagated pose as the updated propagated pose.

5. The method of claim 1, wherein GPS provides position, velocity and covariance information in North-east down (NED) format and further comprising:
converting the intermediate propagated pose into NED format; and wherein the EKF propagator produces propagated poses in North-east down (NED) format.

6. The method of claim 1, wherein GPS provides doppler, pseudo ranges and covariance information in Earth-centered, Earth-fixed (ECEF) format and further comprising:
converting the intermediate propagated pose into ECEF format; and wherein the EKF propagator produces propagated poses in Earth-centered, Earth-fixed (ECEF) format.

7. The method of claim 1, wherein GPS provides NED position and covariance information in North-east down (NED) format and further comprising:
converting the intermediate propagated pose into NED format; and wherein the EKF propagator produces propagated poses in North-east down (NED) format.

8. The method of claim 1, wherein the IMU propagates a position every 5 ms, and wherein an error is accumulated over time; and every 100 ms, an updated information is received from the GPS receiver; and wherein the updated information is used to correct the error.

9. A system including a processor and a computer readable storage unit storing instructions that when executed by the processor perform the method of claim 1.

10. A non-transitory computer readable medium storing instructions that when executed by a processor perform a method of claim 1.

11. A method for guiding an autonomous mobile platform, including:
receiving images from at least 4 cameras providing at least two frames, each frame providing a 360-degrees view about a centerline of the mobile platform;
determining, by a processor, a 360-degrees depth map from the frames;
estimating, by a processor, a propagated pose from the 360-degrees depth map;
fusing a first propagated pose from the depth map with a second propagated pose from an IMU to provide an intermediate propagated pose to an Extended Kalman Filter (EKF) propagator;
receiving at the EKF propagator a third propagated pose from an odometry sensor coupled with at least one wheel of the autonomous mobile platform;
preparing, by a processor, an updated propagated pose from the intermediate and third propagated poses; and
providing the updated propagated pose to guide a mobile platform.

12. The method of claim 11, further comprising:
detecting a failure condition of the IMU; and
responsive to the failure condition of the IMU detected, determining the intermediate pose using the first propagated pose from the images.

13. The method of claim 11, further comprising:
detecting a failure condition of at least one of the at least 4 cameras;
when a single camera fails resulting in no 360-degrees view, responsively using image information from remaining cameras to determine the first propagated pose; and when all cameras fail resulting in no image information, responsively using data from the IMU to determine the intermediate propagated pose.

14. The method of claim 11, further comprising:
detecting a failure condition of the odometry sensor; and
responsive to the failure condition, providing the intermediate propagated pose as the updated propagated pose.

15. A system including a processor and a computer readable storage unit storing instructions that when executed by the processor perform the method of claim 11.

16. A non-transitory computer readable medium storing instructions that when executed by a processor perform a method of claim 11.

17. A method for guiding an autonomous mobile platform, including:
receiving images from at least 4 cameras providing at least two frames, each frame providing a 360-degrees view about a centerline of the mobile platform;
determining, by a processor, a 360-degrees depth map from the frames;
estimating, by a processor, a propagated pose from the 360-degrees depth map;
fusing a first propagated pose from the depth map with a second propagated pose from an IMU to provide a first intermediate propagated pose to an Extended Kalman Filter (EKF) propagator;
fusing the first intermediate propagated pose from the images and the IMU with a third propagated pose from an odometry sensor coupled to at least one wheel, to provide a second intermediate propagated pose to an EKF propagator;
receiving at the EKF propagator a fourth propagated pose from a GPS receiver;
preparing, by a processor, an updated propagated pose from the second intermediate and fourth propagated poses; and
providing the updated propagated pose to guide a mobile platform.

18. The method of claim 17, further comprising:
detecting a failure condition of the IMU; and
responsive to the failure condition of the IMU detected, determining the first intermediate pose using the first propagated pose from the images.

19. The method of claim 17, further comprising:
detecting a failure condition of at least one of the at least 4 cameras;
when a single camera fails resulting in no 360-degrees view, responsively using image information from remaining cameras to determine the first propagated pose; and
when all cameras fail resulting in no image information, responsively using data from the IMU to determine the first intermediate propagated pose.

20. The method of claim 17, further comprising:
detecting a failure condition of the odometry sensor; and
responsive to the failure condition, providing the first intermediate propagated pose as the second intermediate propagated pose.

21. The method of claim 17, further comprising:
detecting a failure condition of the GPS receiver; and
responsive to the failure condition, providing the second intermediate propagated pose as the updated propagated pose.

22. A system including a processor and a computer readable storage unit storing instructions that when executed by the processor perform the method of claim 17.

23. A non-transitory computer readable medium storing instructions that when executed by a processor perform a method of claim 17.

* * * * *